(12) United States Patent
Justice et al.

(10) Patent No.: US 10,350,813 B2
(45) Date of Patent: Jul. 16, 2019

(54) UNIVERSAL IN-MOLD LABELING APPARATUS AND SYSTEM INCORPORATING THE APPARATUS

(71) Applicant: Graham Packaging Company, L.P., Lancaster, PA (US)

(72) Inventors: Roman Justice, Lititz, PA (US); Robert P. Bartnik, York, PA (US); Gregory D. Taylor, York, PA (US); Ryan Smith, Harrisburg, PA (US); Scott E. Bysick, Elizabethtown, PA (US)

(73) Assignee: Graham Packaging Company, L.P., Lancaster, PA (US)

( * ) Notice: Subject to any disclaimer, the term of this patent is extended or adjusted under 35 U.S.C. 154(b) by 140 days.

(21) Appl. No.: 15/489,825

(22) Filed: Apr. 18, 2017

(65) Prior Publication Data

US 2017/0305059 A1 Oct. 26, 2017

Related U.S. Application Data

(60) Provisional application No. 62/325,256, filed on Apr. 20, 2016.

(51) Int. Cl.
*B29C 49/24* (2006.01)
*B29C 49/28* (2006.01)
(Continued)

(52) U.S. Cl.
CPC .......... *B29C 49/24* (2013.01); *B29C 49/2408* (2013.01); *B29C 49/28* (2013.01);
(Continued)

(58) Field of Classification Search
CPC ...... B29C 2049/241; B29C 2049/2412; B29C 2049/2443; B29C 2049/2449;
(Continued)

(56) References Cited

U.S. PATENT DOCUMENTS 4,582,474 A * 4/1986 Ziegler ............... B29C 49/2408
425/503
4,708,630 A * 11/1987 Hammond .............. B29C 49/24
264/509

(Continued)

OTHER PUBLICATIONS

International Search Report by the European Patent Office for International Application No. PCT/US2017/028349 dated Jul. 5, 2017.

*Primary Examiner* — William P Bell
(74) *Attorney, Agent, or Firm* — Stradley Ronon Stevens & Young, LLP

(57) ABSTRACT

A system combining a machine for blow-molding articles with a universal in-mold labeling apparatus. The apparatus has a frame on which turntables are mounted. Each turntable has an air rotary union, facilitating rotation of the respective turntable, and suction cups adapted to pick, hold, and release labels. The turntables deliver labels to the open molds of the machine. The apparatus also has a vertical slide positioned between the turntables. A placement head engages the turntables and moves up the vertical slide to a position in the open molds. At least one label magazine is affixed to the frame and retains the labels. Strategically placed air valves provide air and vacuum to pick, hold, and release labels. A human machine interface facilitates communication between an operator of the system and the system. Finally, a control system is provided to allow the operator to program and control both the machine and apparatus.

20 Claims, 13 Drawing Sheets

(51) Int. Cl.
  *B29C 49/48* (2006.01)
  *B29C 49/78* (2006.01)
  *B65C 1/02* (2006.01)
  *B65C 9/04* (2006.01)
  *B65C 9/10* (2006.01)
  *B65C 9/28* (2006.01)
  *B65C 9/40* (2006.01)
  *B29L 22/00* (2006.01)
  *B29C 49/04* (2006.01)
  *B29C 49/36* (2006.01)

(52) U.S. Cl.
  CPC .............. *B29C 49/48* (2013.01); *B29C 49/78* (2013.01); *B65C 1/02* (2013.01); *B65C 9/04* (2013.01); *B65C 9/10* (2013.01); *B65C 9/28* (2013.01); *B65C 9/40* (2013.01); *B29C 49/04* (2013.01); *B29C 49/36* (2013.01); *B29C 2049/2412* (2013.01); *B29C 2049/2449* (2013.01); *B29C 2049/2454* (2013.01); *B29C 2049/2479* (2013.01); *B29C 2049/4869* (2013.01); *B29C 2949/78983* (2013.01); *B29L 2022/00* (2013.01)

(58) Field of Classification Search
  CPC .... B29C 2049/2458; B29C 2049/2472; B29C 2049/2485; B29C 2049/2497; B29C 49/24; B29C 49/2408; B29C 49/36
  See application file for complete search history.

(56) References Cited

U.S. PATENT DOCUMENTS

| | | | |
|---|---|---|---|
| 4,840,366 A | | 6/1989 | Johnston et al. |
| 5,044,922 A | | 9/1991 | Plenzler et al. |
| 5,104,306 A | * | 4/1992 | Gordon ............... B29C 49/2408 156/571 |
| 5,121,913 A | | 6/1992 | Klinedinst, Sr. et al. |
| 5,256,365 A | | 10/1993 | Gordon et al. |
| 6,183,238 B1 | | 2/2001 | Dunlap et al. |
| 6,264,876 B1 | * | 7/2001 | Ballay ................. B29C 49/2408 264/509 |
| 8,871,135 B2 | * | 10/2014 | Hausladen ............ B29C 49/02 264/509 |
| 2003/0006536 A1 | * | 1/2003 | Dunlap ............... B29C 49/2408 264/509 |
| 2012/0040037 A1 | | 2/2012 | Kwasniewski et al. |

* cited by examiner

UNIVERSAL IN-MOLD LABELING APPARATUS AND SYSTEM INCORPORATING THE APPARATUS

RELATED APPLICATION

This application claims the benefit of priority to U.S. Patent Application No. 62/325,256 titled "UNIVERSAL IN-MOLD LABELING MACHINE," filed on Apr. 20, 2016, the contents of which are incorporated in this application by reference.

TECHNICAL FIELD

The present invention relates generally to machines for manufacturing hollow articles from thermoplastic materials by blow molding and, more particularly, to rotary blow-molding machines having a universal in-mold labeling (UIML) capability.

BACKGROUND OF THE INVENTION

Blow molding is a fabrication method for hollow thermoplastic shapes. There are two general classes of plastic products made using the blow-molding process and related machinery: packaging products and technical parts. Packaging products include such items as bottles, jars, jugs, cans, and other containers. Technical parts include automotive components such as bumpers, fuel tanks, functional fluid containers, ducting, and the like. The term "articles" is used to encompass either or both packaging products and technical parts.

The blow-molding process can be of two general types: extrusion blow molding and injection blow molding. In extrusion blow molding, a thermoplastic parison is lowered from an extruder and between mold halves. The mold halves close around the parison, and the parison is then expanded against a mold cavity by introduction of a blowing gas, usually air. In injection molding, a thermoplastic material is first injection molded into a preform parison which is then transferred to a blow mold and expanded in the same manner as in an extrusion blow-molding process.

In intermittent extrusion, the molds are mounted to a common platen and the parisons are extruded by either a reciprocating screw extruder or by a ram accumulator which holds in readiness a volume of molten plastic material needed to make the next article or articles. In continuous extrusion, a molten parison is produced from an extruder die without interruption, and a segment of the parison is severed and positioned into a mold. The molds can be moved from station to station on rotating vertical wheels, on a rotating horizontal table, or with a reciprocating action. When the parison is extruded, the mold is moved under the extruder die or flow head to receive the parison segment and then is moved to a blowing station.

The positioning of the parison relative to the mold in a rotary system is relatively difficult. Therefore, many of the current blow-molding machines use the reciprocating mold concept according to which the molds are shuttled back and forth from station to station. A major drawback of the reciprocating mold concept, however, is a limitation on production rate.

A. Horizontal Rotary Blow-Molding Machines

Horizontal rotary blow-molding machines allow for high production rates of uniform containers. Such machines index circumferentially spaced mold halves in steps around a vertical axis. The mold halves each capture a vertical, continuously growing parison at an extrusion station. In one machine, the flow head extruding the parison moves up away from the mold halves after the mold halves close to capture the parison. The parison is severed adjacent the top of the mold halves, the mold halves are moved away from the extrusion station, and a top blow pin is moved into the end of the captured parison at the top of the mold halves to seal the mold cavity and blow the parison. Subsequently, the flow head and dependent parison are lowered back to the initial position so that the new parison is in position to be captured by the next pair of mold halves. The blown parison cools as the mold halves are rotated around the machine, following which the mold halves open at an ejection station and the finished article, commonly a bottle or other article, is ejected from between the mold halves. The machine includes an in-mold labeling station between the ejection station and the extrusion station for applying labels to the interior surfaces of the mold cavities.

In another horizontal rotary blow-molding machine the parison grows down over a blow pin at the bottom of the mold halves before closing of the mold halves. The flow head is moved up above the closed mold before severing of the new parison from the captured parison. The mold is then indexed laterally to the next station without dropping and the captured parison is blown within the cavity. In a further horizontal rotary blow-molding machine, the whole turntable supporting all of the mold halves is raised and lowered during rotation as each mold captures a parison at the extrusion station.

B. Labeling Machinery

Conventionally, labels are supplied to mold sections of rotary blow-molding machines by an in-mold labeling apparatus having transfer heads that engage and move the labels. The transfer heads are connected to a drive mechanism that cycles the heads back and forth between a label pick up position and a label transfer position. The heads carry vacuum cups for engaging and holding labels. When in the label pick up position, the heads are moved against labels held in label magazines to form vacuum connections with the labels. Movement of the heads away from the magazines pulls labels from the magazines. The labels are carried with the heads for subsequent placement in cavities in the mold sections.

During the cycle of a conventional in-mold labeling apparatus, it is necessary to move the vacuum cups on the transfer heads into engagement with the lead label in the magazine and form a strong vacuum connection with the label sufficient to assure that the label is held in place on the head as the head is withdrawn from the magazine and the label is stripped out past the gripping fingers in the magazine. The head is dwelled or paused for a relatively long interval with the cup on the label in order to assure that the pressure within the cup is reduced sufficiently to form the desired strong vacuum connection with the label. The dwell interval is required to assure that the air captured within the cup upon physical engagement with the label can be withdrawn from the cup through the vacuum manifold to the vacuum source thereby reducing the pressure in the cup and forming the desired strong connection.

It is conventional to minimize the dwell interval during which the connection is formed by reducing the vacuum of the vacuum source and by locating the vacuum source close to the suction cup. The labels cannot be reliably removed from the magazines, however, if the interval is made too small or the vacuum is too weak.

Single labels cannot be withdrawn using a very strong vacuum. This problem occurs because, if the vacuum is too high, air is drawn through the thickness of the lead label and the cup holds two or more labels in place and will withdraw all the held labels when moved from the label magazine. Withdrawal of more than one label at a time produces at least a reject article and can result in shut down of an entire blow-molding line.

The baskets used to supply labels for pick up by in-mold label apparatus extend away from the label pick up positions. As labels are exhausted from the fronts of the baskets, operators must refill the baskets in order to assure continued in-mold labeling. The baskets are located close to the other parts of the in-mold labeling apparatus and the blow-molding machine. This close proximity makes loading of the baskets difficult.

The label baskets are mounted on the frame of the in-mold labeling system using a connection which permits limited rotation of the baskets to adjust the rotary positions of the labels as presented to the pick up heads. This rotational adjustment of the baskets permits limited adjustment of the angular position of the labels when picked up from the basket and when placed in the mold sections. In some blow-molding operations, labels are placed in mold cavities which are angularly oriented relative to the label transfer heads. The limited rotational adjustability of the magazines is not sufficient to permit labels to be rotated through a relatively large angle for proper placement in these oriented mold cavities. Mounting of the magazines at a rotational position sufficient to assure proper orientation for placement of the labels in the angularly oriented mold sections can make it difficult to refill the baskets with labels in order to assure continuous operation of the blow molding line.

U.S. Pat. No. 4,840,366 discloses an in-mold labeling apparatus and method in which a label transfer assembly is moved up and down between label pick up and label transfer or discharge positions by rotation of a fly wheel carrying a cam follower. The cam follower is fitted in a cam slot in a transverse cam member mounted on the label transport assembly. The transport assembly includes a pair of label carriages. When the assembly is at the lower or label pick up position, stops collapse the carriages to extend and retract the label transfer heads and vacuum cups for label pick up in response to the vertical movement of the assembly. Likewise, when the rotation of the drive member elevates the label transfer assembly to the upper or transfer position, stops collapse the carriages to extend the heads, vacuum cups, and held labels for movement of the labels into mold cavities and transfer of labels to the mold halves. Vertical movement of the label transfer assembly and the extension and retraction of the label transfer heads are both driven through the single connection between the rotating drive member and the cam plate.

Current rotary blow-molding machines are capable of operating at high production rates. In order to operate these machines at maximum speed, the in-mold labeling apparatus must necessarily operate rapidly with great reliability and a short cycle time. Increased production rates for blow molding articles requires that the in-mold labeling apparatus must pick up and place labels in the mold halves at ever-increasing rates. In an in-mold labeling apparatus such as the apparatus disclosed in U.S. Pat. No. 4,840,366 where the head assemblies move reciprocally, increased production rates greatly increase inertial forces on moving parts and cause vibration and undesired stressing in the entire machine. The vibration and stresses extend from the in-mold labeling apparatus down through the drive connection to the common drive motor used to power the apparatus and also the blow-molding machine.

The unwanted forces occur because of the large loading forces required to rapidly accelerate and decelerate the relatively large members of the in-mold labeling apparatus up and down between the labeling pick up positions and because of the large forces required to rapidly accelerate and decelerate the label transfer heads as they are moved in and out during label pick up and label transfer. Wear is experienced at the cam plate where the drive member transmits the forces necessary to both reciprocate the label transfer assembly between the pick up and labeling positions and extend and retract the label transfer heads.

U.S. Pat. No. 5,121,913 discloses an in-mold labeling apparatus and method. The apparatus includes a label transfer assembly having a pair of label carriages, each with two label heads and two suction cups for engagement with labels from a magazine or a source of labels and placement of the labels in mold cavities of a blow molding machine. A continuously rotating drive member operates a first rotary drive to raise and lower the label transfer assembly between the label pick up and label discharge positions while dwelling the assembly at the two positions during fo label pick up and transfer. The drive member also operates a second rotary drive to extend and retract the dwelled label transfer heads at the two positions to pick up labels and then place the labels in mold cavities.

In the in-mold labeling apparatus of U.S. Pat. No. 5,121,913, the loading forces are reduced by providing separate drives connected to a rotating wheel for independently moving the label transfer assembly up and down and independently extending and retracting the label transfer heads. Separate drives reduce transmitted forces and wear. Further, the maximum forces transmitted through the drives are timed to occur at different intervals during the cycle of operation thereby spreading the forces in time and reducing stress on the drive system. The use of a separate drive for extending and retracting label transfer heads reduces the amount of mass moved during this operation with a commensurate reduction in forces experienced along the drive train.

U.S. Pat. No. 5,104,306 discloses an in-mold labeling system. A division of the application which issued as that patent itself issued as U.S. Pat. No. 5,256,365 and discloses a related in-molding labeling method. The system includes an in-mold labeling apparatus for moving labels to a rotary blow-molding machine and placing the labels in the cavities of mold sections and a rotary label transfer apparatus for withdrawing labels from label magazines and presenting the labels for pick up by the transfer heads of the in-mold labeling apparatus. The in-mold labeling apparatus includes pairs of label transfer heads on each side of the apparatus. Separate rotary label transfer apparatus are provided on each side of the in-mold labeling apparatus to present labels to the adjacent label transfer heads. Each rotary transfer apparatus includes a pair of rotary transfer wheels and a pair of label magazines, one magazine for each wheel. The wheels carry transfer units which are moved to positions opposite the magazines, are extended to engage labels in the magazines, are withdrawn, and are moved to pick up positions where the labels are transferred to the transfer heads of the in-mold labeling apparatus. During movement to the pick up positions, the labels may be rotated to assure proper angular orientation when picked up by the in-mold labeling apparatus for placement in the mold sections.

The rotary transfer wheels operate to pick up labels from the magazines and move the labels for pick up by the in-mold labeling apparatus during the relatively long time interval while the in-mold labeling apparatus transfer heads move the labels to the mold sections, place the labels in the mold cavities, and return to pick up the next labels. This long cycle period provides sufficient time to form reliable vacuum connections between the vacuum cups on the heads of the transfer wheels and the lead label in the label magazine. A sufficiently high vacuum is used to assure a connection which withdraws one label at a time from the magazine. The pressure in the suction cups holding the labels on the transfer wheels is reduced before the labels are moved for pick up by the in-mold labeling apparatus in order to facilitate ready transfer of the labels held by the suction cups of the wheel to the suction cups of the in-mold labeling apparatus transfer heads.

Reliable label pick up from the magazines is facilitated by movement of the label transfer heads in the units directly toward the magazines so that the suction cups do not move laterally with respect to the magazines during engagement with the lead labels and during withdrawal of the captured individual labels from the magazines. The rotary label transfer apparatus includes a pair of rotary wheels that pick labels from magazines and move the labels to positions for pick up by the transfer heads. Location of the label magazines in free available space within the in-mold labeling system is facilitated by use of a first, large-diameter rotary wheel having three 120 degree-spaced label transfer units and a second, relatively smaller diameter wheel having four 90 degree-spaced label transfer units. Both wheels are rotated in steps with the first wheel rotated 120 degrees in each step and the second wheel rotated 90 degrees in each step. Each wheel simultaneously supplies labels to the in-mold labeling apparatus while permitting the two label magazines to be oriented at different angles in desired locations within the in-mold labeling system.

To overcome the shortcomings of conventional blow-molding machines having in-mold labeling (IML) capability, a new machine having a universal in-mold labeling (UIML) capability is provided. In view of the relatively large commercial demand for various types of labeled plastic articles, it would be desirable to have a blow-molding machine that can produce high-quality, labeled articles quickly and at a relatively low cost. The present invention satisfies this desire.

An object of the present invention is to upgrade various components of conventional IML apparatus and also provide increased accuracy in label placement onto the article. Related objects are to improve the efficiency of conventional IML apparatus, increase production, and reduce scrap. Another object is to overcome the relatively low output of conventional apparatus by producing articles with relatively high output.

It is still another object of the present invention to avoid difficult setup procedures. An additional object is to provide a control system that coordinates and controls operation of the various components of the system. Yet another object is to provide increased control over key parameters during the in-mold labeling process.

SUMMARY OF THE INVENTION

To achieve these and other objects, to meet these and other needs and desires, and in view of its purposes, the present invention provides a system that combines a machine for blow-molding containers from a parison with a universal in-mold labeling (UIML) apparatus. The machine has a turntable continuously rotating about an axis of rotation in an endless circle without stopping. A flow head forms and provides the parison and is fixedly positioned at a first station of the machine proximate the turntable. A plurality of molds are carried by the turntable to position each of the molds adjacent the flow head in turn, each mold including mold portions which are movable between an open configuration to receive the parison from the flow head and a closed configuration to mold the parison.

The UIML apparatus of the system has an upper frame assembly with at least two turntables rotatably mounted on the upper frame assembly. Each turntable has an air rotary union, facilitating rotation of the respective turntable, and a plurality of suction cups adapted to pick, hold, and release labels. The turntables deliver labels to the molds when the molds are in the open configuration.

The UIML apparatus also has a Z-axis vertical slide positioned symmetrically between the two turntables. A placement head engages equally the two turntables and moves up the Z-axis vertical slide to a position between the open mold portions. At least one label magazine is affixed to the upper frame assembly and retains a plurality of labels. Strategically placed air valves provide air and vacuum to pick, hold, and release labels. At least one of a human machine interface, a pendant, and an operator interface facilitate communication between an operator of the system and the system.

Finally, a control system is provided to allow the operator to program and control both the blow-molding machine and the universal in-mold labeling apparatus.

It is to be understood that both the foregoing general description and the following detailed description are exemplary, but are not restrictive, of the invention.

BRIEF DESCRIPTION OF THE DRAWING

The invention is best understood from the following detailed description when read in connection with the accompanying figures. It is emphasized that, according to common practice, the various features of the figures are not to scale. On the contrary, the dimensions of the various features are arbitrarily expanded or reduced for clarity. Included in the drawing are the following figures.

DETAILED DESCRIPTION OF THE INVENTION

Described below is an improved system that combines two main components: a rotary blow-molding machine 10 and a universal in-mold labeling (UIML) apparatus 100. The UIML apparatus 100 picks up labels from label magazines or label sources and accurately and rapidly places the labels in the mold halves of the blow-molding machine 10. Following placement of the labels in the mold halves, the mold halves close over a plastic parison and the parison is inflated within the closed cavities to form an article, conventionally a bottle or other container. The labels are bonded to the expanded parison to form integral parts of the article.

A. Rotary Blow-Molding Machine

Figure 1:
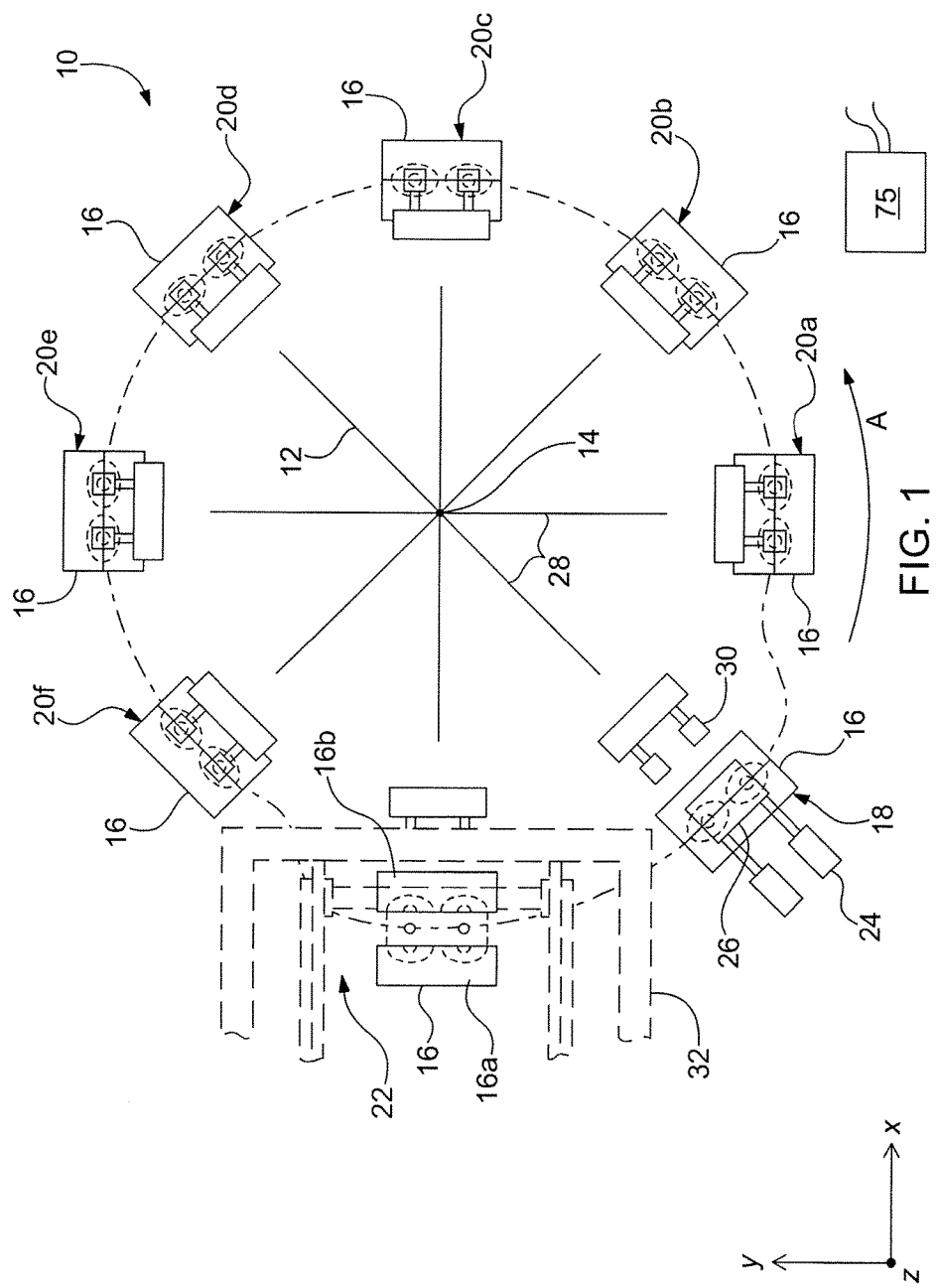
FIG. 1 is a schematic plan view of several of the basic components of an exemplary blow-molding machine according to the present invention.

Referring now to the drawing, in which like reference numbers refer to like elements throughout the various figures that comprise the drawing, FIG. 1 shows a schematic plan view of several of the basic components of an exemplary blow-molding machine 10. The machine 10 includes a turntable 12 rotatable by an electric motor (not shown) about an axis of rotation 14. Preferably, the turntable 12 is oriented horizontally (in the x-y plane) and the axis of rotation 14 is substantially vertical (along the z-direction).

One or more molds 16 are mounted on the turntable 12. Counterclockwise rotation of the turntable 12, in the direction of arrow A in FIG. 1, positions each mold 16 successively at a plurality of stations. Among the stations are a first station 18; a plurality of intermediate stations including second station 20a, third station 20b, fourth station 20c, fifth station 20d, sixth station 20e, and seventh station 20f; and a last station 22. The number of stations is equal to the number of molds 16 on the turntable 12, eight in the example illustrated, although more or fewer stations are feasible. Each mold 16 has two mold halves 16a and 16b which can be moved between an open configuration, as shown at the last station 22, and a closed configuration, shown at the first station 18 and the intermediate stations 20a-20f.

The machine 10 also includes an extruder 24 which feeds molten polymer resin to a flow head 26 positioned at the first station 18. (For this reason, the first station 18 can also be called the extrusion station.) Although a wide variety of plastic resin materials can be used, including polypropylene, polyvinylchloride (PVC), and polycarbonate, a preferred material is polyethylene terephthalate (PET). The flow head 26 is advantageously stationary, meaning that the flow head 26 is fixed in a single, constant position at all times. Preferably, the flow head 26 is positioned above the turntable 12.

The first station 18 is positioned at a predetermined angle 28 relative to the last station 22 as measured with respect to the turntable axis of rotation 14. By "predetermined" is meant determined beforehand, so that the predetermined angle 28 must be determined, i.e., chosen or at least known, before the machine 10 is used. For the example configuration shown in FIG. 1, for which eight stations are provided, the predetermined angle 28 is preferably an acute angle of about 45 degrees. This relative positioning is advantageous because it provides increased cooling time for a molded article as it traverses the large remaining angle (315° in the illustrated example) occupied by the intermediate stations 20a-20f and the last station 22 before being released from the mold 16 at the last station 22. (Because the article is released at the last station 22, the last station 22 can also be called the ejection station.)

The machine 10 also includes a plurality of blow pins 30 mounted on the turntable 12. The blow pins 30 cooperate with each of the molds 16 to form a calibrated neck on the article and inject compressed gas into a parison received within the mold 16 to conform the parison to the shape of the mold 16. The parison is a hollow tube of molten polymer resin that is extruded continuously from the flow head 26. The dimensions of the calibrated neck are held to relatively high precision and close tolerances. An article takeout device 32 is positioned at one of the stations (as illustrated in FIG. 1, the takeout station may be the last station 22) for removing articles from the mold 16 after they have cooled and for transporting the articles for further processing, such as de-flashing.

In order to present the molds 16 to the stationary flow head 26, each mold 16 is mounted on a respective carriage which is movably mounted on a respective inclined ramp. The inclined ramps are mounted on the turntable 12.

Operation of the various components of the machine 10 such as rotating the turntable 12, opening and closing the molds 16, raising and lowering the carriages, accelerating the inclined ramps and their associated carriages and molds 16, and moving the takeout device 32 are controlled and coordinated by a control system 75 shown in FIG. 1. The control system 75 is preferably a microprocessor-based device such as a personal computer (PC) or a programmable logic controller (PLC) which executes resident software controlling the functional operation of the machine 10. Communication between the various machine components and the control system 75 may be by wire, by wireless, or by a combination of both wire and wireless communications. Wireless communications are especially advantageous for controlling components on rotating machinery, such as the turntable 12, because these communications avoid the need for complex rotary contacts to transmit electrical signals across rotary interfaces where components are moving relative to one another. Feedback to the control system 75 is provided by various sensors such as micro switches and optical sensors deployed and positioned as required to provide positional information and other status-related information.

B. Universal In-Mold Labeling (UIML) Machine

Figure 13:
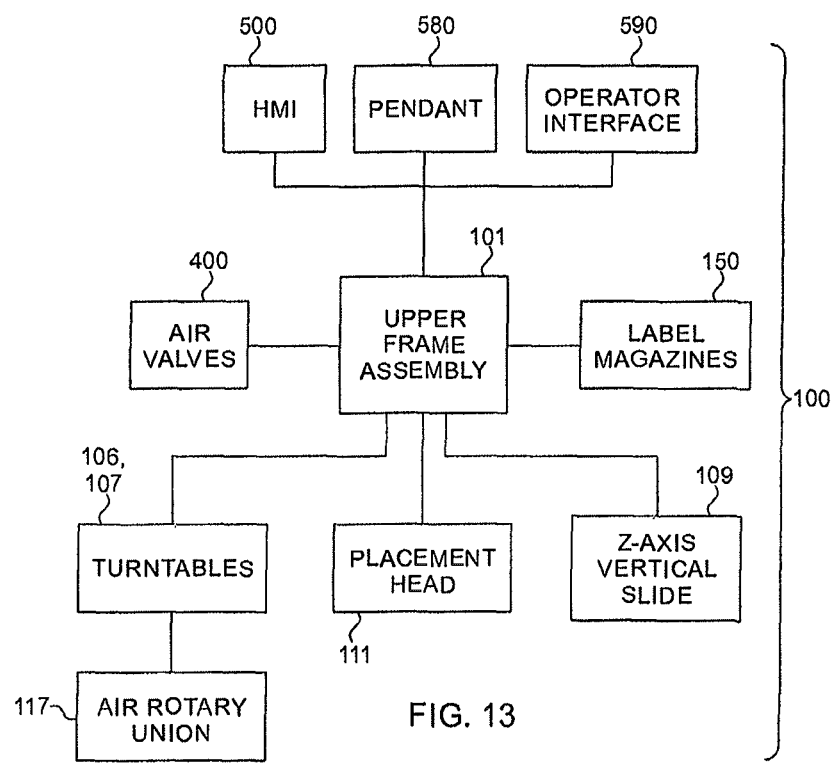
FIG. 13 is a schematic block diagram illustrating the main components of the exemplary UIML apparatus according to the present invention.

The UIML apparatus 100 is used in combination with the rotary blow-molding machine 10. As described in detail below, and illustrated schematically in the block diagram of FIG. 13, the UIML apparatus 100 includes (but is not limited to) the following main components: an upper frame assembly 101; at least two turntables 106 and 107 each having an air rotary union 117; a Z-axis vertical slide 109; a placement head 111; at least two label magazines 150; strategically placed air valves 400; and a human machine interface 500, a pendant 580, and an operator interface 590—all of which facilitate communication between the operator and the UIML apparatus 100.

1. Upper Frame Assembly

Figure 2:
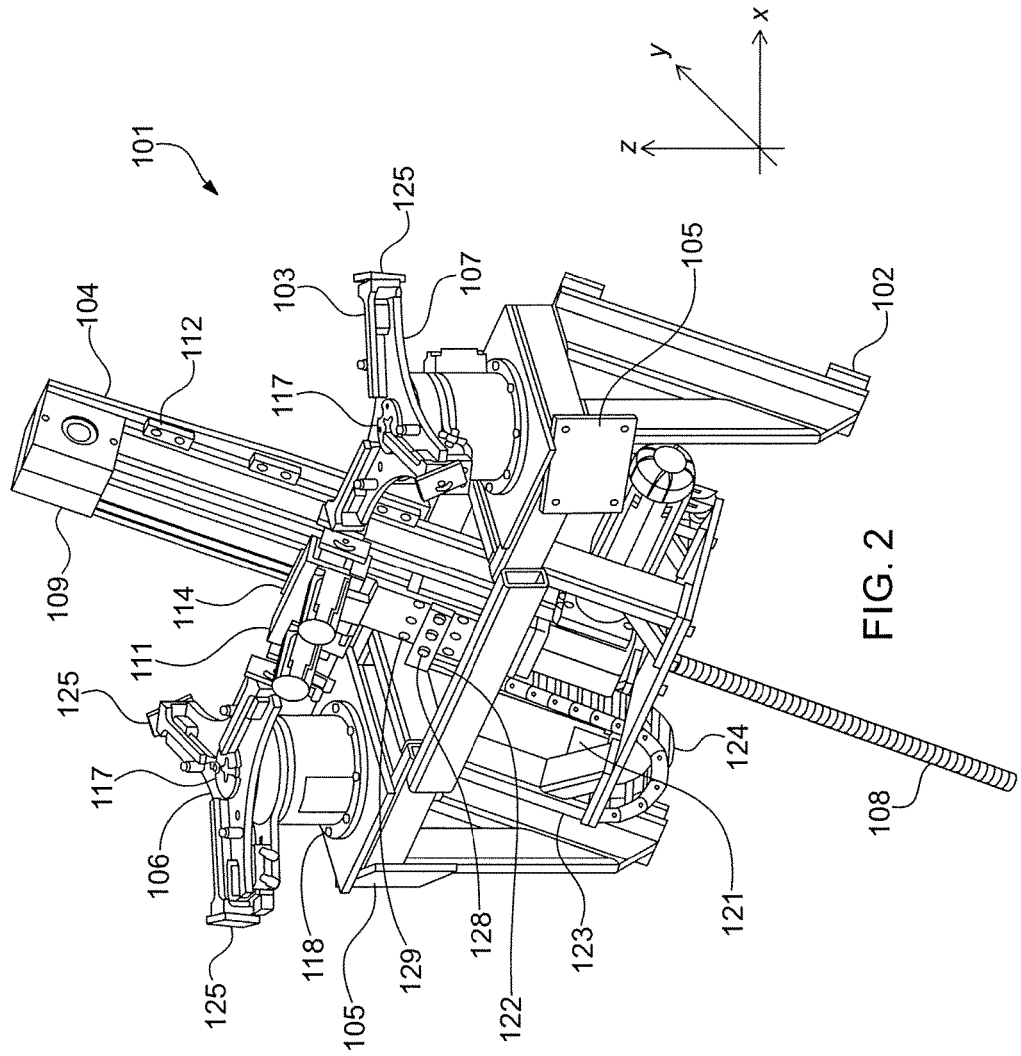
FIG. 2 illustrates, in a perspective view, the upper frame assembly of an exemplary UIML apparatus according to the present invention.

FIG. 2 illustrates, in a perspective view, the upper frame assembly 101 of an embodiment of the UIML apparatus 100. The upper frame assembly 101 has a number of pillow block bearings 102 (four are illustrated). Linear slide mounts 103 and 104 are provided on a Z-axis vertical slide 109. Held in position by linear slide clamps 112, the linear slide mounts 103 and 104 facilitate movement of the Z-axis vertical slide 109 up and down the vertical Z axis along a threaded rod 108.

Two turntables, a left turntable 106 and a right turntable 107, are positioned symmetrically on either side of the Z-axis vertical slide 109. The turntables 106, 107 are mounted to the upper frame assembly 101 by a plurality of fasteners 118. A rotary union 117 is provided in each turntable 106, 107 to facilitate rotation of the turntables 106, 107. Each turntable 106, 107 has a number (three are illustrated) of suction cups 125. The suction cups 125 are typically made of plastic and are adapted, using a vacuum, to pull labels from a basket or magazine 150 in which the labels reside. The magazines 150 are affixed to the upper frame assembly 101 through basket mounts 105.

A cable track 123 is provided to facilitate movement of the Z-axis vertical slide 109. A lower cable track mount 121, an upper cable track mount 122, and a cable track mount 124 locate the cable track 123. Fasteners 128 and 129 mount the carriage mount 353 to the carriage of the upper frame assembly 101. A placement head 111 is positioned on a carriage mounting plate 114.

Both turntables 106, 107 operate simultaneously. Each turntable 106, 107 delivers a label to one of the two mold halves 16a, 16b. Thus, each mold half 16a, 16b receives its own label (for disposition on the front and back of the article). The turntables 106, 107 rotate to pick labels from the respective magazines 150 affixed to the basket mounts 105, then rotate to the center section where the labels are transferred to the placement head 111. The placement head 111 then moves up the Z-axis vertical slide 109 into position between the mold halves 16a, 16b. Once the placement head 111 is in position, the placement arms 304 of the placement head 111 extend into the mold halves 16a, 16b; place the labels; and retract. The placement head 111 then moves down the Z-axis vertical slide 109, and the turntables 106, 107 rotate to pick labels and repeat the process.

2. UIML Label Magazines or Baskets

Figure 3:
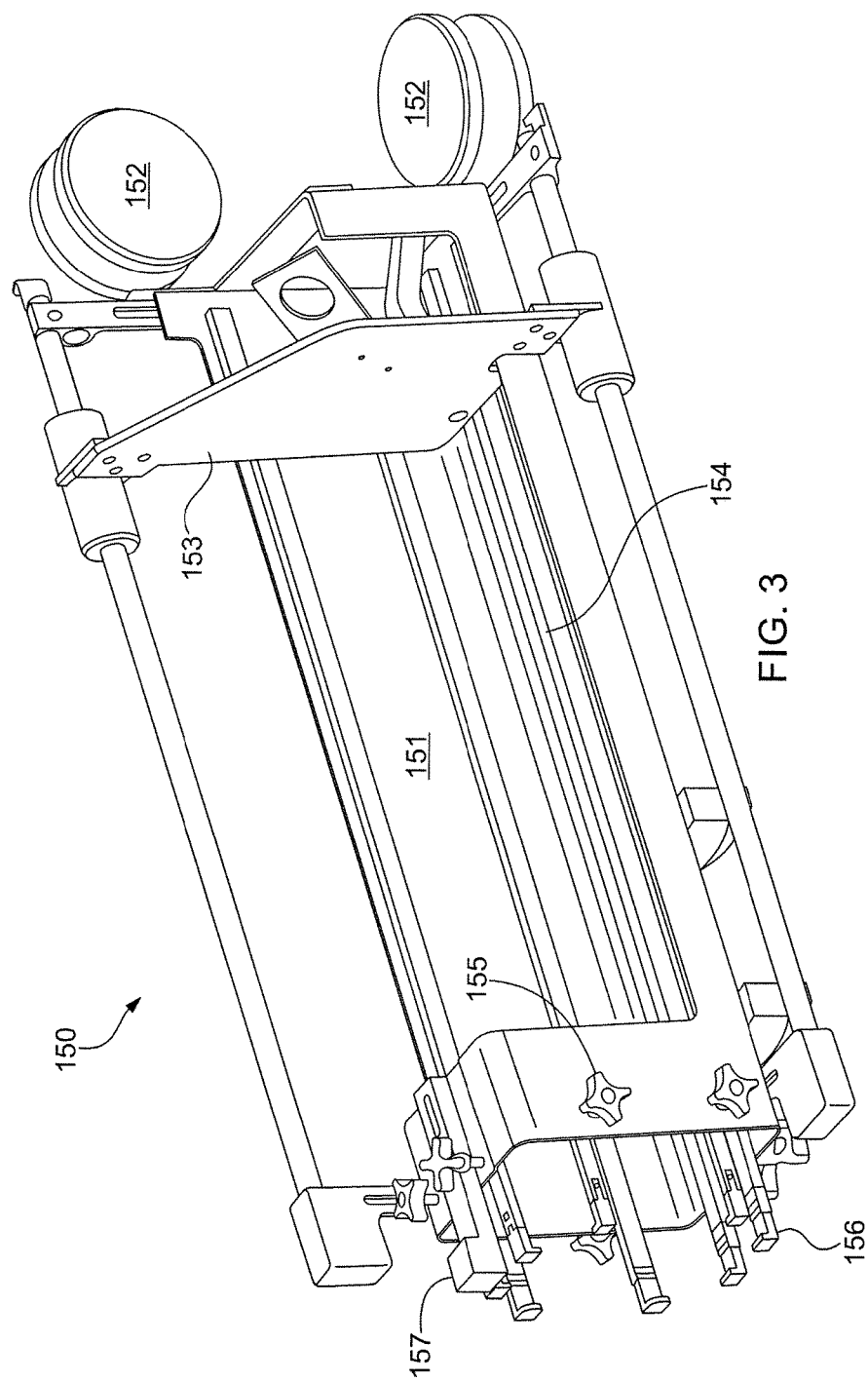
FIG. 3 is a perspective view of an exemplary label basket or magazine, which is affixed to the upper frame assembly shown in FIG. 2, according to an embodiment of the present invention.

More details about the label baskets or magazines 150, which are affixed to the upper frame assembly 101 through the basket mounts 105, are provided with reference to FIG. 3. Although other types are suitable, there are generally two types of label magazines 150: (1) a yo-yo spring tension magazine available, for example, from Krones AG of Germany; and (2) an air assist cylinder. Both types of label magazines 150 serve the same purpose of moving the labels forward in the label magazine 150 as the labels are dispensed. The first type of label magazine 150 is illustrated in FIG. 3.

As illustrated, the label magazine 150 includes seven main parts or components. A tray 151 is made of formed sheet metal and receives the labels when they are loaded into the label magazine 150. A spring 152 in the spring-driven system provides the force to push the labels towards the front of the label magazine 150. A back plate 153 is driven by the spring 152 to push the labels in the tray 151. Steel rails 154 provide the surface on which the labels ride along in the tray 151. The steel rails 154 must be free of defects to allow smooth movement of the labels down the tray 151. Finger adjustment knobs 155 are used to adjust the fingers 156 at the front of the label magazine 150. The fingers 156 are typically aluminum parts that prevent the labels from spilling out the front of the label magazine 150. A fan/fluff air nozzle 157 connects to a fan air supply (not shown) so that a small amount of air can be blown between the first few labels at the front of the label magazine 150. This air enhances separation between, and assures clean picks of, the labels.

3. UIML Turntables

As indicated above, the left turntable 106 and the right turntable 107 of the UIML apparatus 100 are transfer components that take labels from the label magazine 150 to the placement head 111. The label transfer process has three, main steps: (1) picking up the label from the label magazine 150; (2) transferring the label to the placement head 111 once the placement head 111 moves down the Z-axis vertical slide 109 and into proper position; and (3) delivering the label to the mold cavity. The first two steps of this process are accomplished by using turntables 106, 107 and a transfer arm 213 that has a high vacuum of 15-20 inches on the magazine side.

Vacuum is measured as inches of mercury (Hg) on a scale of 0 to 30. A tube vacuum gauge measures the reduced pressure (vacuum) from atmospheric pressure downwards towards zero pressure, but the numbers on the scale read from 0 towards a maximum of 30 inches. This is called "gauge pressure" and varies depending on the atmospheric pressure. Mechanical vacuum gauges such as the Bourdon dial gauge read from "zero" at atmospheric pressure down to a full scale vacuum reading of 30 inches of Hg. As the pressure drops (or goes down), the vacuum reading number rises (or goes up). Low pressure is equivalent to high vacuum and vice versa.

To begin the process, a pick cylinder 207 is activated and moves the transfer arm 213 to the label magazine 150. There, one label is removed at a time for immediate use. Next, the turntable 106 or 107 indexes the label toward the placement head 111. On the placement head side of the turntable 106 or 107, the transfer arm 213 switches to a low vacuum (3-5 inches), so that the placement head 111 can remove the label from the transfer arm 213 of the turntable 106 or 107 easily. The placement head 111 must have 20-25 inches of vacuum to remove the label from the transfer arm 213 of the turntable 106 or 107 consistently, and to be able to withstand the later movement into the mold cavity.

The turntables 106 and 107 are controlled by one or both of a programmable logic controller (PLC) and an absolute multi-turn encoder which instructs or instruct the turntables 106 and 107 when to do all the operations needed for the label transfer process. A PLC is a digital computer used for automation of typically industrial electromechanical processes, such as control of machinery on factory assembly lines. A programmable limit switch (PLS) is used in a variety of rotating shaft control applications, typically to switch machine devices "On" and "Off" directly. The PLS may interface with other microprocessor-based control systems, such as the PLC.

Figure 4:
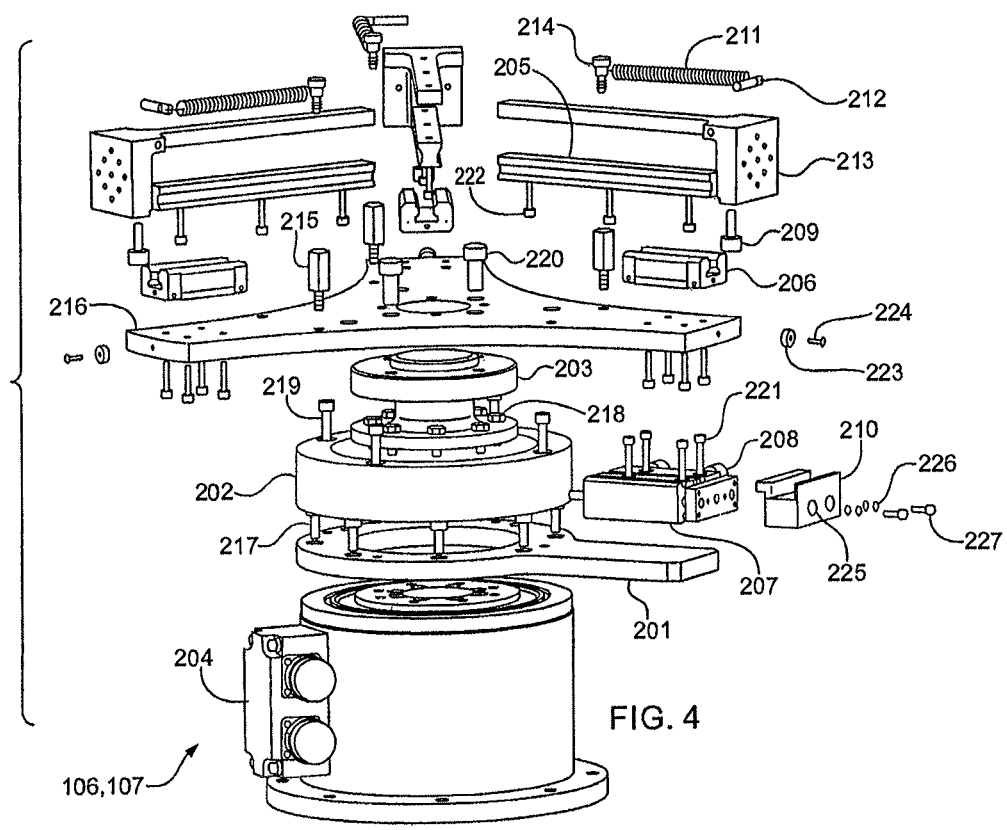
FIG. 4 is a schematic view of the lower portion of a turntable used on the exemplary UIML apparatus according to the present invention, illustrating, with components separated for clarity, a direct drive rotary (DDR) servo motor, a pick cylinder, a label basket pick cam, transfer arms, and a starwheel.

As illustrated in FIG. 4, the lower portion of the turntable 106, 107 has five main parts or components: a direct drive rotary (DDR) servo motor 204, the pick cylinder 207, a label basket pick cam 210, the transfer arms 213, and a starwheel 216. The starwheel 216 is an aluminum plate that rotates the transfer arms 213 around from the pick station to the transfer station. Fasteners 220 mount the starwheel 216 to a rotating spacer 203. The starwheel 216 also has a plurality of standoffs 215. A rubber bumper 223 is affixed to each end of the starwheel 216 using a screw 224.

Each transfer arm 213 is mounted on a linear slide 205 which slides within a linear bearing 206 to pick a label from the label magazine 150 and retract back into place. The DDR servo motor 204 (for example, a Model DH061M-22-1317 available from Kollmorgen Corporation of Radford, Va.) is housed in the turntable 106, 107. This configuration reduces the footprint of the turntable 106, 107. The pick cylinder 207, which has a number of fittings 208, fires the transfer arm 213 out to pick a label from the label magazine 150. The transfer arm 213 then retracts back into position. The label basket pick cam 210 is attached to the pick cylinder 207 and captures the bearing 206 under the transfer arm 213. A plain washer 225 and a lock washer 226 are affixed to the end of the label basket pick cam 210 using a screw 227. A cam follower 209 is also provided. Bolts 222 mount the transfer arm 213 to the linear rail 205 and mount the linear bearing 206 to the starwheel 216. When the pick cylinder 207 is fired out, the cam track pulls the cam follower 209 and the transfer arm 213 with it.

Also illustrated in FIG. 4, the upper portion of the turntable 106, 107 has seven main parts or components: pick cylinder mount 201, a guard 202, the rotating spacer 203, the linear rail 205, the linear bearing 206, at least a pair of fittings 207, and a return spring 211. The transfer arms 213 attach to the linear rail 205, and the linear rail 205 rides in the linear bearing 206. Affixed by anchor studs 212 on one end and by shoulder bolts 214 on the opposite end, the return springs 211 keep the zs transfer arms 213 retracted at all times unless they are in the label pick position. The pick cylinder 207 overrides the return spring 211 and allows the transfer arm 213 to extend to pick a label. The linear bearing 206 receives the transfer arm 213 and the linear rail 205.

The rotating spacer 203 is a movable aluminum component to which the starwheel 216 attaches. The rotating spacer 203 is also attached to the turntable of the DDR servo motor 204. Thus, the rotating spacer 203 connects the starwheel 216 to the DDR servo motor 204.

The guard 202 protects the rotating parts of the DDR servo motor 204. The guard 202 is preferably made of ultra-high-molecular-weight (UHMW) polyethylene, which is a subset of the thermoplastic polyethylene. Also known as high-modulus polyethylene (HMPE) or high-performance polyethylene (HPPE), UHMW polyethylene has extremely long chains. The longer chains transfer load more effectively to the polymer backbone by strengthening intermolecular interactions. This results in a very tough material, with the highest impact strength of any thermoplastic presently made.

The pick cylinder mount 201 is a stationary component, preferably made of aluminum, on which the pick cylinder 207 is mounted using bolts 221. The pick cylinder mount 201 is itself mounted to the non-moving portion of the turntable of the DDR servo motor 204 using bolts 217. Bolts 218 mount the rotating spacer 203 driven by the DDR servo motor 204 to the starwheel 216. Fasteners 219 mount the guard 202 to the pick cylinder mount 201.

The fittings 207 are typically choke valves or other similar fittings for the pick cylinder 207. These fittings 207 are used to fine-tune the extension of the pick cylinder 207. The fittings 207 have small manual regulators to allow the user to limit the airflow for both the extend and retract ports.

Highlighting the guard 202, that component in part replaces a slotted ring used in one conventional IML apparatus to provide low and high vacuum air. The turntables 106 and 107 of the UIML apparatus 100 instead use the rotary union 117 to provide air through the center section. The elimination of the conventional slotted ring is advantageous because the slotted ring required high maintenance.

4. UIML Placement Head

Figure 5A:
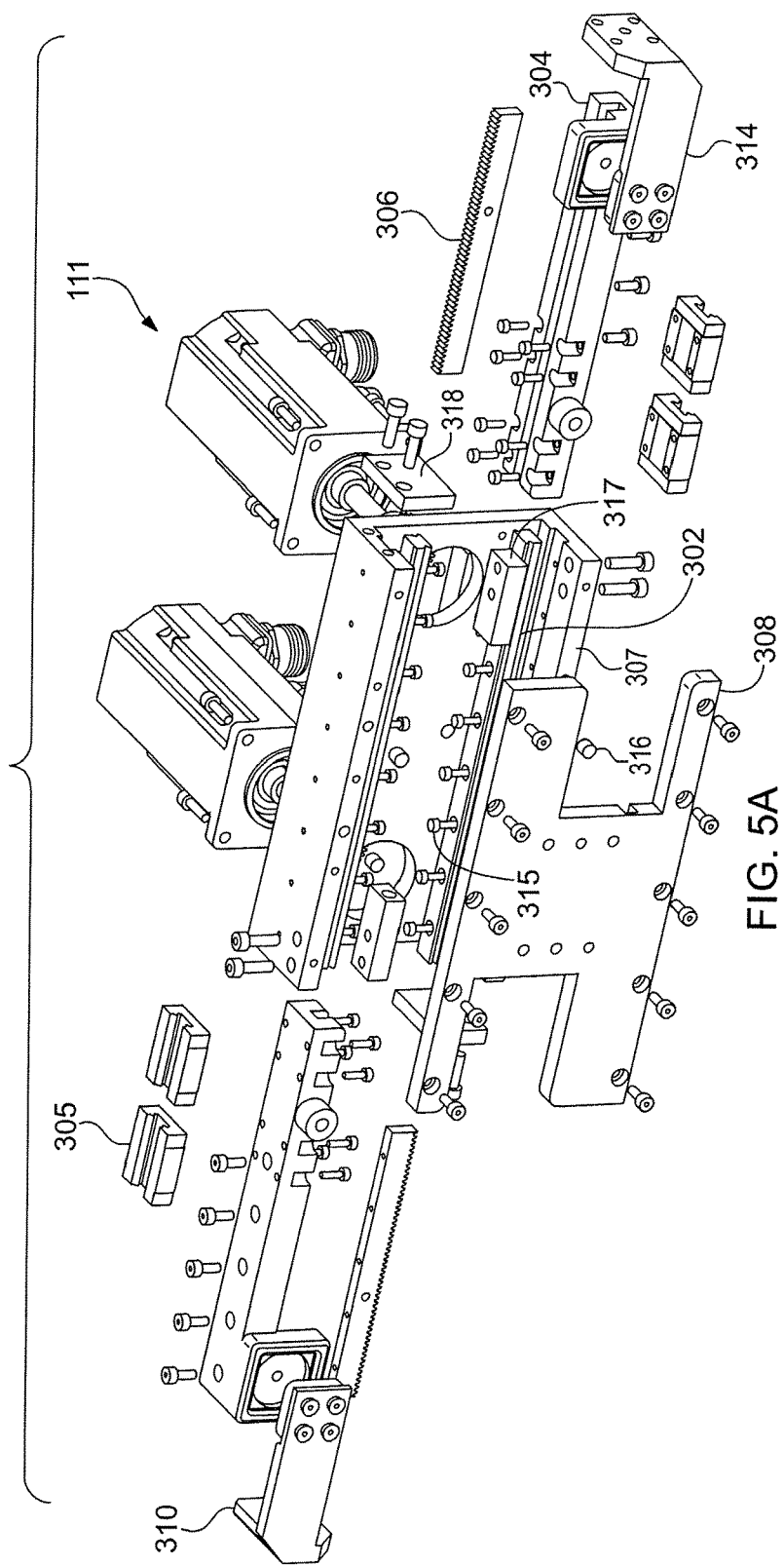
FIG. 5A is a rear perspective view, with components separated for clarity, of a placement head, which constitutes a component of the exemplary UIML apparatus, according to the present invention.
Figure 5B:
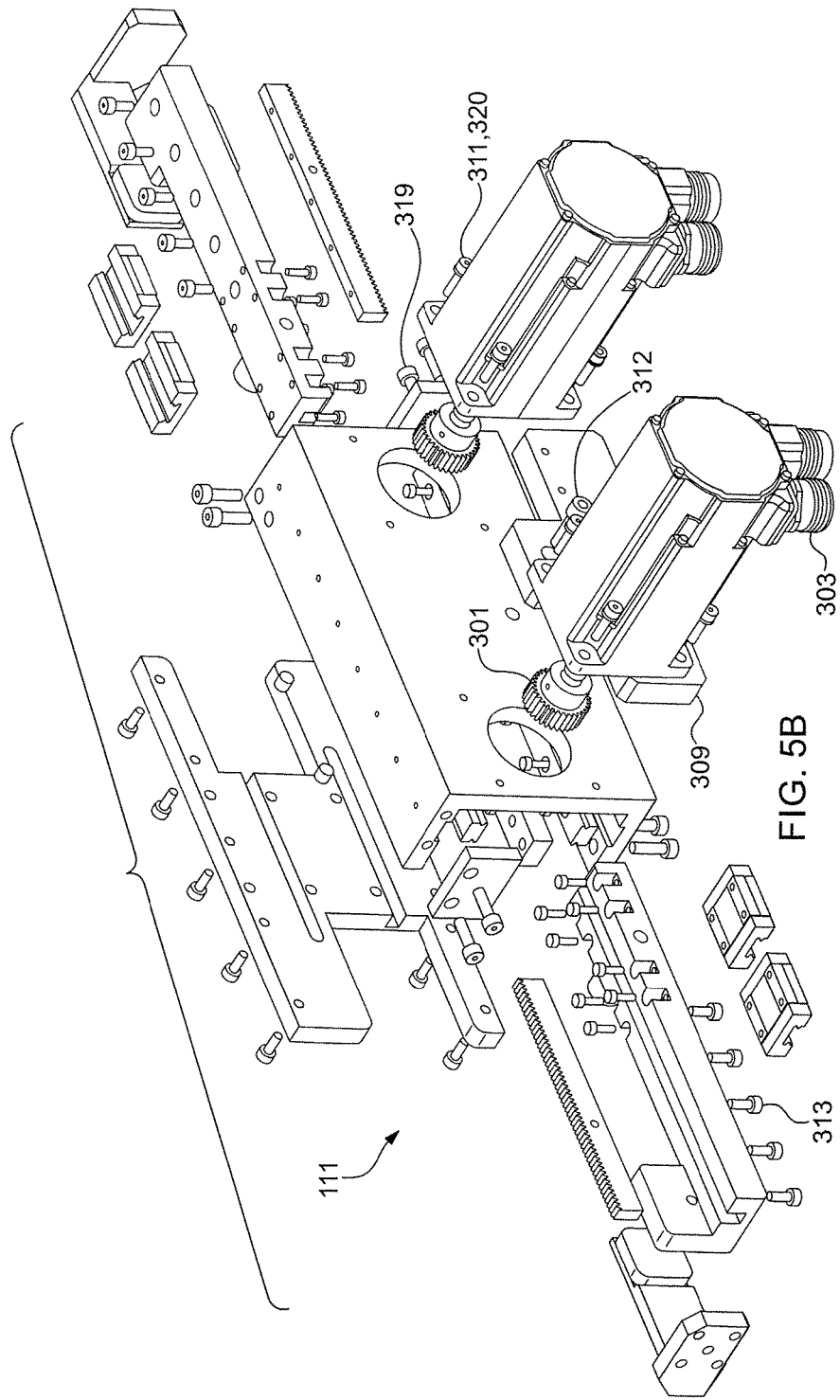
FIG. 5B is a front perspective view, again with components separated for clarity, of the placement head shown in FIG. 5A.

The UIML placement head 111 of the UIML apparatus 100 is illustrated in FIGS. 5A and 5B. FIG. 5A is a rear perspective view, and FIG. 5B is a front perspective view, of the placement head 111. The placement head 111 is substantially symmetrical and is designed to engage equally the two turntables 106 and 107 disposed on opposite sides of the placement head 111. The placement head 111 has nine main parts or components: a pinion gear 301, a placement servo motor 303, an insert or placement arm 304, a breakaway arm 310, linear bearings 305 that ride along a linear rail 302, a geared rack 306, a valve plate mount 309, a mechanical forward stop 317, and a mechanical rearward stop 318.

The placement arm 304 picks the labels from the turntables 106, 107 and inserts the labels into the mold 16. The placement arm 304 has a magnet and a plurality of fasteners 313. The breakaway arm 310 is a plastic component that has a steel piece attached to its end using fasteners 314. The steel piece is attached to the magnet on the placement arm 304. The plurality of linear bearings 305 attach to the placement arm 304 and ride along the linear rail 302. The forward stop 317 mechanically stops the placement arm 304 and prevents the placement arm 304 from extending too far. The rearward stop 318 mechanically stops the placement arm 304 during retraction.

The pinion gear 301 is attached to the shaft of the placement servo motor 303 with a set screw. The pinion gear 301 drives movement of the placement arm 304. The geared rack 306 is attached to the placement arm 304 and is driven by the pinion gear 301. The placement servo motor 303 (two are illustrated by way of example in FIGS. 5A and 5B) drives the placement arm 304 via the pinion gear 301 and the geared rack 306. Suitable placement servo motors 303 are Model AKM24D-BNGNR-00 available from Kollmorgen Corporation of Radford, Va.

The valve plate mount 309 provides a support surface to which Mac valves are attached. The Mac valves provide the air to the placement components. Fasteners 312 engage the valve plate mount 309.

The placement head 111 further includes a first (motor) housing 307 and a second (mounted) housing 308. The placement servo motors 303 are mounted to the first housing 307 using a combination of a plurality of spring lock washers 320 and fasteners 311. The linear rails 302 are attached to the first housing 307 using fasteners 315. The second housing 308 is attached to the first housing 307 using fasteners 316. The mechanical rearward stops 318 are attached to the first housing 307 using fasteners 319.

The UIML placement head 111 carries the labels from the turntables 106, 107 into the mold 16. The placement arms 304 of the placement head 111 then extend into the mold 16. The labels are then released and the placement head 111 returns to the transfer position.

5. UIML Z-Axis Vertical Slide

Figure 6:
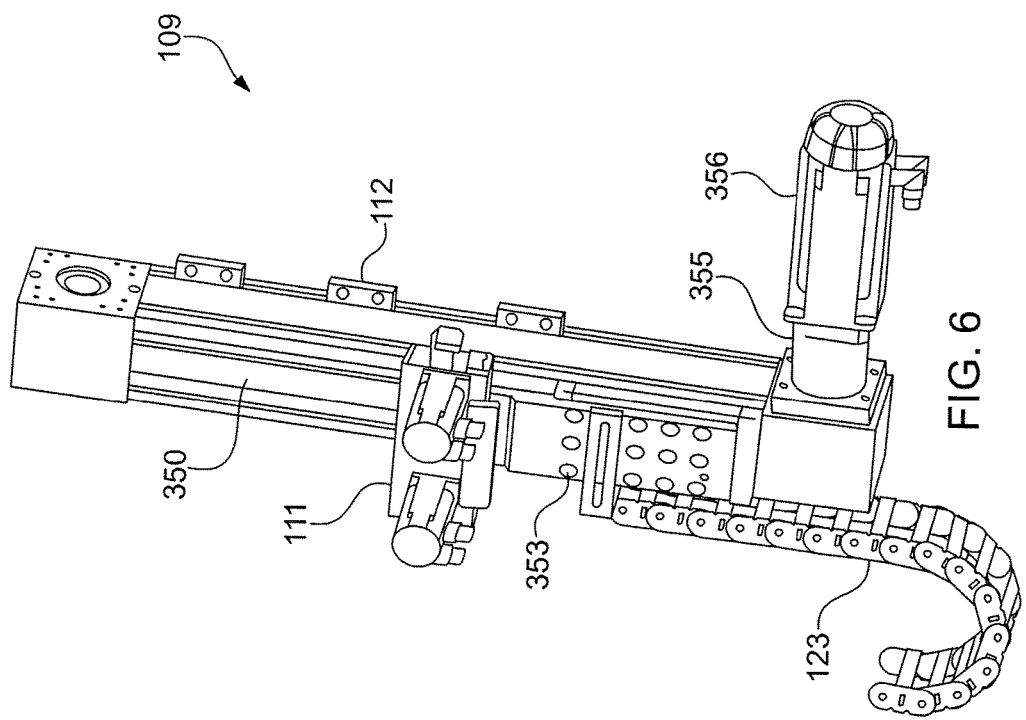
FIG. 6 is a schematic view of the Z-axis vertical slide used on the exemplary UIML apparatus according to the present invention.

The UIML apparatus 100 uses the Z-axis vertical slide 109, driven by servo motors, to move the placement head 111 up and into the molds 16, and then back down to the transfer position. As illustrated in FIG. 6, the Z-axis vertical slide 109 has seven main parts or components. A linear slide 350 moves the placement head 111 into the mold 16 and back to the transfer position. A suitable linear slide 350 is available from Paletti USA, LLC of Montgomeryville, Pa. The placement head 111 (discussed above) transfers the label from the turntables 106, 107 to the mold 16 via the linear slide 350. The carriage mount 353 is provided for the placement head 111. The placement head 111 is attached to the carriage mount 353, and the carriage mount 353 engages the linear slide 350. The cable track 123 is provided to run all the cables and air lines to the placement head 111. A motor gear box 355 (also available from Paletti) houses a servo motor 356. A suitable servo motor 356 is Model AKM54H-BKC2R-00 available from Kollmorgen. A single servo motor 356 is illustrated. A series of linear slide clamps 112 are used to mount the linear slide 350 to its mounting plate.

Figure 7:
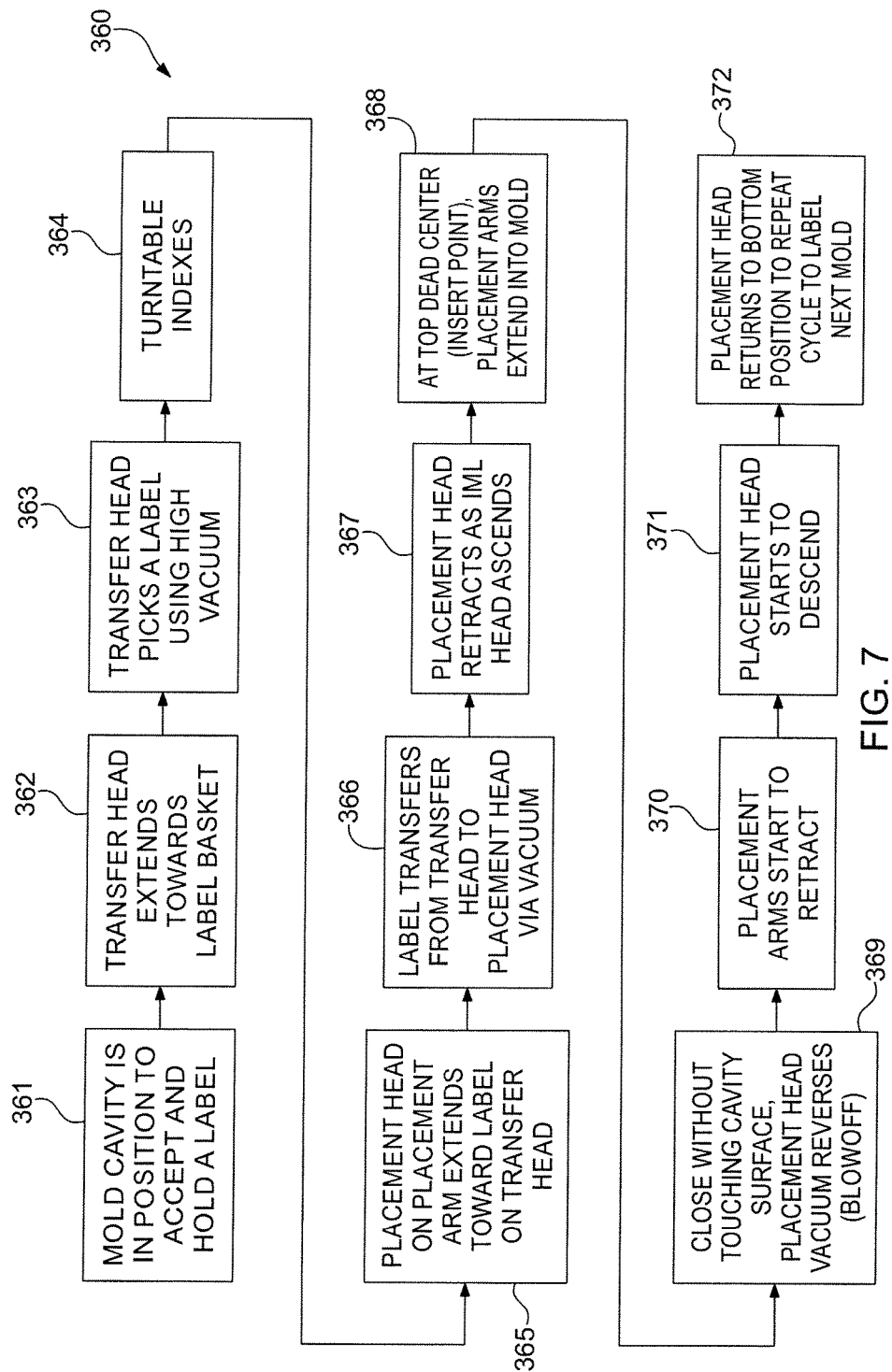
FIG. 7 shows the various steps of a method used to transfer labels from the label magazine of the UIML apparatus to the mold of the blow-molding machine according to the present invention.

The method 360 used to transfer labels from the label magazine 150 of the UIML apparatus 100 to the mold 16 of the rotary blow-molding machine 10 is illustrated in FIG. 7. In the first Step 361 of the method 360, the mold 16 is moved into position such that the cavity defined by the mold halves 16a and 16b is ready to accept and hold a label. In Step 362, the transfer arms 213 of the turntables 106 and 107 extend toward the label magazines 150. In Step 363, the transfer arms 213 each pick a label using high vacuum. In Step 364, the turntables 106 and 107 index. In Step 365, the placement arms 304 on the placement head 111 extend toward the labels on the transfer arms 213 of the turntables 106 and 107. In Step 366, the labels transfer from the transfer arms 213 to the placement head 111 via vacuum. In Step 367, the placement head 111 retracts as the Z-axis vertical slide 109 ascends. In Step 368, at top dead center (the insert point), the placement arms 304 extend into the mold 16. In Step 369, the vacuum of the placement head 111 reverses and the labels are blown off the placement arms 304. In Step 370, the placement arms 304 start to retract. In Step 371, the placement head 111 starts to descend. Finally, in Step 372, the placement head 111 returns to its bottom position to repeat the cycle and insert labels into the next mold 16.

Upon insertion of the labels into the mold 16, the mold halves 16a, 16b close on the parison, air is blown through the blow pins 30 into the parison, and the parison is blown against the mold cavity wall embedding the labels on to the surface of the article.

6. UIML Air Components

The UIML apparatus 100 uses air valves 400 to pick, transfer, and place the labels into the mold cavity. Air is supplied through a main air line. After passing through a filter, a regulator, and an accumulator, the air goes through a pressure switch located on the air line. The air line has a T-port that directs air to both sides of the UIML apparatus 100. From the T-port, the air line extends to a manifold. There are five outlet ports in the manifold: (1) a high air pressure regulator which directs air to the high air pressure valves on the valve cluster; (2) a low air pressure regulator which directs air to the low pressure valves on the valve cluster; (3) a pick cylinder and fan air supply; (4) a placement head blowoff air supply; and (5) a placement head vacuum supply.

Figure 8:
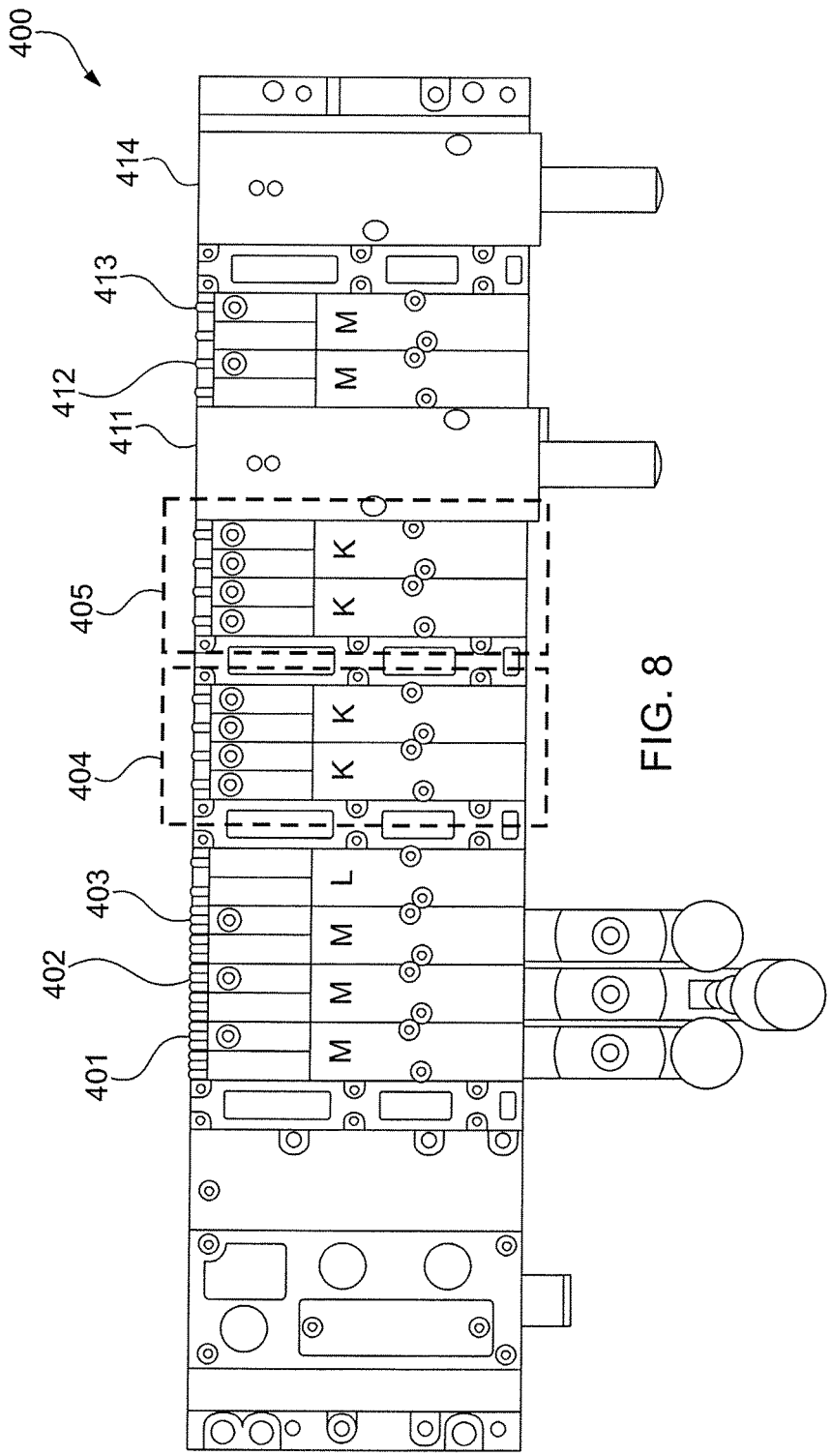
FIG. 8 depicts the air valves, which constitute a component of the exemplary UIML apparatus, according to the present invention.

The air valves 400 are illustrated in FIG. 8. A first air valve 401 and accompanying regulator are dedicated to the pick cylinder 207. Two air lines extend from the valve 401 and regulator and provide pressure to the pick cylinder 207 to extend and retract the pick cylinder 207. A second air valve 402 and accompanying regulator are dedicated to providing fan (riffle) air to the front of the label magazine 150 to separate the first few labels (e.g., 3-5 labels). An extra air valve 403 is typically not used, but is available to provide air for additional functions. A plurality of high air valves 404 are dedicated to provide high air pressure (in-line vacuum generator down line) to the transfer arms 213. A plurality of low air valves 405 are dedicated to provide low air pressure (in-line vacuum generator down line) to the transfer arms 213.

A digital regulator 411, controlled by a human machine interface or "HMI" discussed more fully below, controls the blowoff pressure of the insert tooling. A blowoff air valve 412 provides blow air pressure to the placement head 111. A vacuum valve 413 provides air pressure to the placement head 111. An in-line vacuum generator creates the vacuum needed on the placement head 111. A digital regulator 414, controlled by the HMI, controls the vacuum pressure of the insert tooling.

The high air pressure/high vacuum pressure is used to pick the label from the label magazine 150 and then hold onto that label as it rotates into the transfer position. The low air pressure/low vacuum pressure is used to hold onto the label as it waits in the transfer position. This pressure needs to be significantly lower to allow the placement head 111 to remove the label from the suction cups 125. The high/low air regulators supply a regulated amount of air to either the high pressure/high vacuum valves or the low pressure/low vacuum valves.

On each air line that requires vacuum, there is an inline vacuum generator providing that vacuum pressure. Suitable vacuum generators for use in the UIML apparatus 100 are available from Coval Vacuum Technology Inc. of Raleigh, N.C. and include, for example, the Coval Model No. VR09F14 venturi vacuum pump. Unlike rotary vacuum pumps which must turn continuously, venturi vacuum pumps can operate discontinuously, only when the suction cups 125 require vacuum. These venturi vacuum pumps have female ends at either side that require a fitting. They may be located in the following air lines: on all six turntable stations (three on the air side and three on the bull gear side) and on both placement head vacuum air lines (one on the air side and one on the bull gear side).

On a majority of the air lines there are inline check valves at various places. The in-line check valves ensure that the air is traveling in one direction and is not "bleeding" into the wrong air line. A suitable check valve for use on the UIML apparatus 100 is Part No. 1096T2 available from McMaster-Carr Supply Company of Elmhurst, Ill. These check valves may be located at the following locations: on each station's high and low air-line before the T-port that connects the high and low lines (there is one check valve at twelve locations (six on the air side and six on the bull gear side) and on the two blowoff lines running to the placement head 111 (one on the air side and one on the bull gear side).

Figure 10:
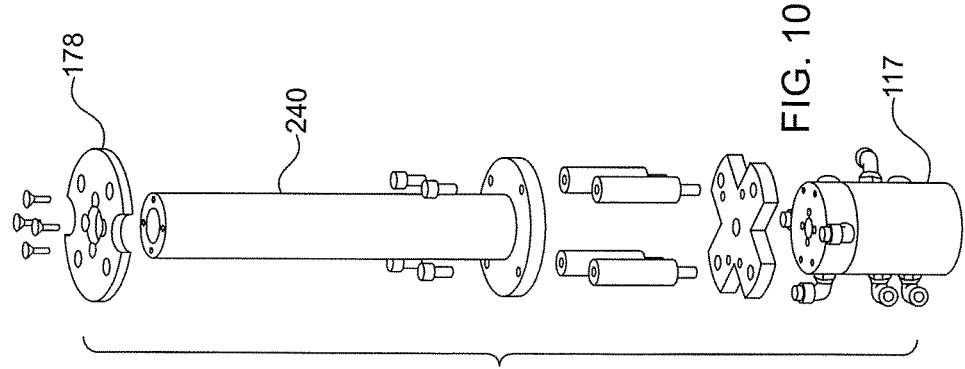
FIG. 10 is a perspective view, with components separated for clarity, illustrating placement of the air rotary union as mounted to the top of the starwheel on the turntable of the UIML apparatus according to the present invention.
Figure 9:
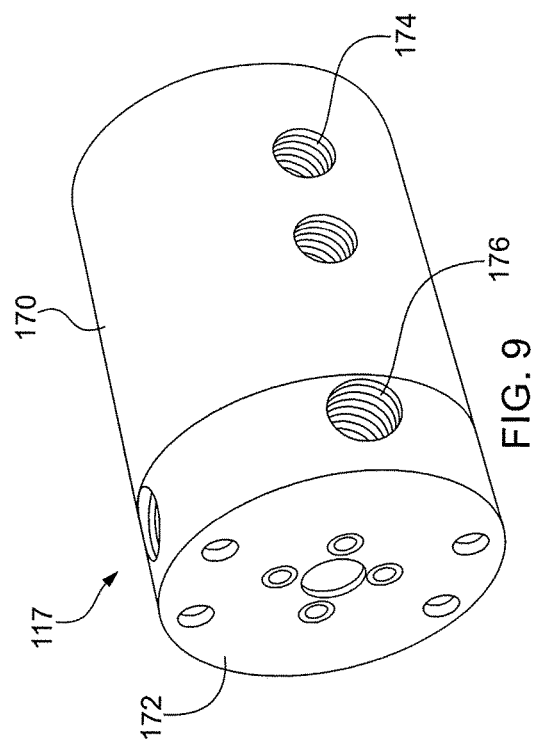
FIG. 9 is a perspective view of an exemplary air rotary union, which is included on each turntable used on the UIML apparatus, according to the present invention.

Included on each turntable 106, 107 is an air rotary union 117. A suitable air rotary union 117 is available from Dynamic Sealing Technologies, Inc. of Andover, Minn., as Part No. LT-2141. A rotary union or swivel joint is a mechanism used to transfer fluid such as air (under pressure or vacuum) from a stationary inlet to a rotating outlet, preserving and isolating the fluid connection. As illustrated in FIG. 9, the air rotary union 117 has a housing 170 in which is disposed a shaft 172 (the head of the shaft 172 is visible in FIG. 9), a bearing, a plurality of seals, and a retaining ring (none of these components are visible). The independent shaft 172 and housing 170 allow for independent rotation of either component. Four inlet ports 174 and four outlet ports 176 are illustrated for purpose of example only; a greater or lesser number of ports is envisioned depending upon the application. Each port 174, 176 is numbered to allow correct input and output connections to and from the air rotary union 117. The tubing that connects to each port 174, 176 is color-coded to help the operator identify the separate air passages. As illustrated in FIG. 10, the air rotary union 117 mounts to the top of the starwheel 216 on the turntable 106, 107, via a mounting plate 178, and goes through the center bore 240 of the DDR servo motor 204.

7. UIML Electrical Components

Figure 11:
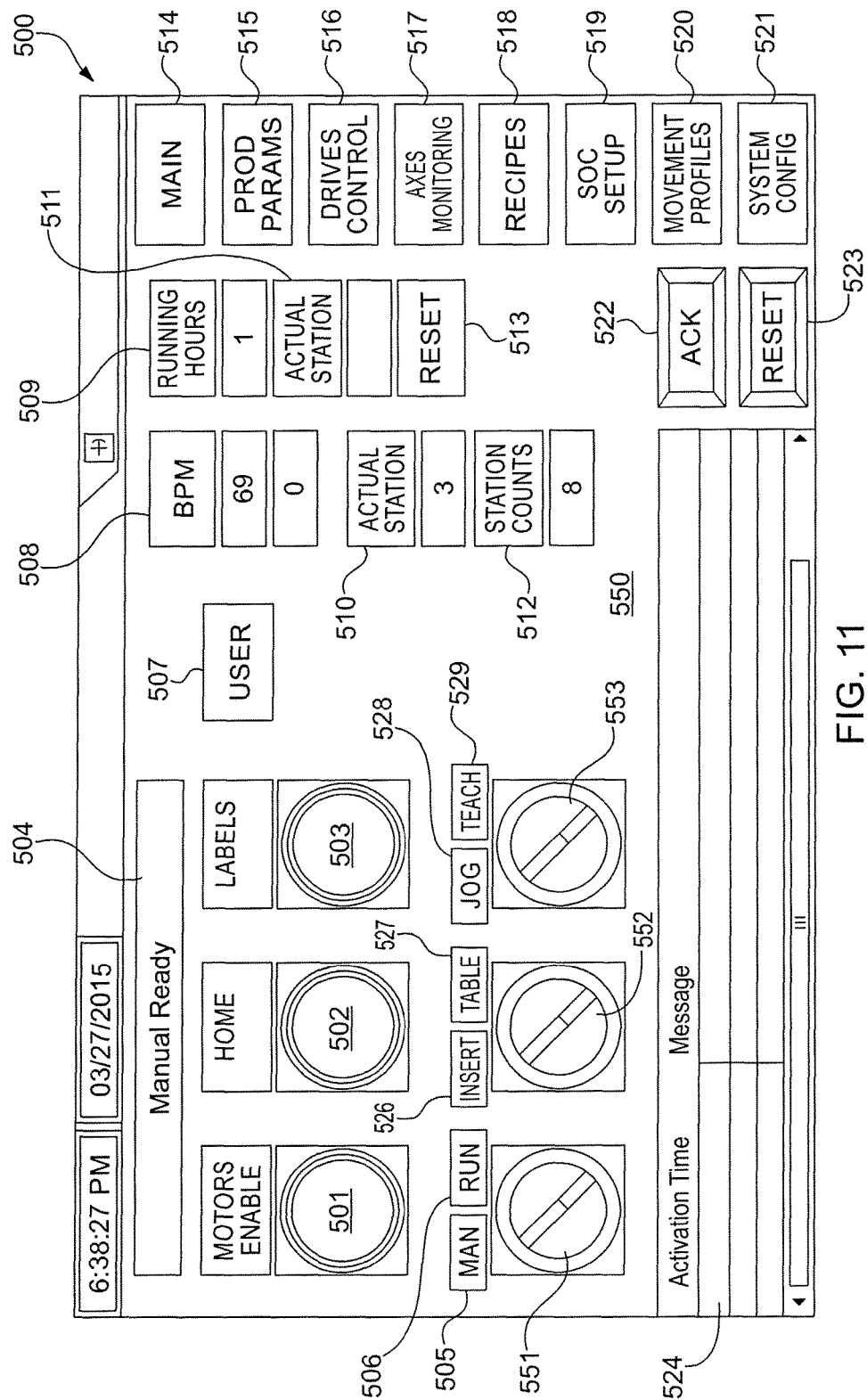
FIG. 11 is a schematic front view illustrating an exemplary human machine interface or "HMI," which constitutes a component of the UIML apparatus and facilitates communication between the operator and the UIML apparatus, according to the present invention.

As illustrated in FIG. 11, the UIML apparatus 100 includes a human machine interface or "HMI" 500. The HMI 500 is a software application that presents information through an interactive display 550 to an operator or user about the state of a process. The HMI 500 also accepts and implements the operator's control instructions, as delivered through the interactive display 550.

The HMI 500 offers a set of screens (one of which is shown in FIG. 11) each with buttons and switches visible and accessible to the operator. In the example embodiment highlighted, the HMI 500 has six screens: (1) a main screen; (2) a production parameters screen; (3) a drives control screen for each of the turntables 106 and 107, the placement head 111, and the Z-axis vertical slide 109; (4) an axes monitoring screen; (5) a recipes screen; and (6) a movement profiles screen. A tabular list of the various elements available on the example HMI 500 follows.

| Element No. | Name | Description/Function |
|---|---|---|
| 501 | Motors Enable | Enables all motors. |
| 502 | Home | Homes all of the UIML axes to their set positions. |
| 503 | Labels | Enables the UIML to run in the Auto-Run mode. |
| 504 | Status Bar | Indicates the current mode of the UIML. |
| 505 | Manual | This mode allows the UIML to run in the manual mode. This mode is used to manually jog the UIML with the pendant and teach the UIML. |
| 506 | Run | This mode allows the UIML to run in the Auto-Run mode. |
| 507 | User Information | The user is selected for the HMI of the UIML (e.g., admin, operator, setup, maintenance). |
| 508 | BPM | A reference indicator of how many bottles or articles per minute are produced by the UIML (which matches the BPMS of the blow-molding machine). |
| 509 | Running Hours | Indicates the amount of hours during which the UIML has been labeling articles. |
| 510 | Actual Station | The station that the encoder has determined is at the label insert position. This must match the actual station on the blow-molding machine. |
| 511 | Bottle Count | An indicator of the number of articles that have been labeled. |
| 512 | Station Counts | A reference number to show the encoder count of the station. |
| 513 | Reset | Resets the "Running Hours" and "Bottle Count" numbers. |
| 514 | Main | Brings the operator to the Main screen of the HMI of the UIML. |

-continued

| Element No. | Name | Description/Function |
|---|---|---|
| 515 | Production Parameters (or "Prod Params") | Brings the operator to the Production Parameters screen of the HMI of the UIML. This screen is where the operator changes various air settings and timings for the UIML. |
| 516 | Drives Control | Brings the operator to the Drives Control screen of the HMI of the UIML. This screen is where the operator can view each individual axis and drive of the UIML and change certain of their parameters. |
| 517 | Axes Monitoring | Brings the operator to the Axes Monitoring screen of the HMI of the UIML. This screen is where the operator can view the status of each axis. Max Torque percentage, following errors, and temperatures are all listed on this screen. |
| 518 | Recipes | Brings the operator to the Recipes screen of the HMI of the UIML. This screen is where the operator can create, load, and save recipes for all settings. |
| 519 | SOC Setup | This feature is typically not used. |
| 520 | Movement Profiles | This screen is where the operator can see an overview of the UIML motions. |
| 521 | System Configure (or "Config") | Brings the operator to the Systems Configure screen of the HMI of the UIML. This screen is where the operator can set certain system configurations. |
| 522 | Acknowledge (or "Ack") | This button allows the operator to clear an alarm. |
| 523 | Reset | This button allows the operator to reset an active alarm. |
| 524 | Alarm History | Displays the most recent alarms with an explanation of why the UIML stopped. |
| 526 | Insert | This mode allows the UIML to run in the Insert mode. |
| 527 | Table | This mode allows the UIML to run in the Table mode. |
| 528 | Jog | This mode allows the UIML to run in the Jog mode. |
| 529 | Teach | This mode allows the UIML to run in the Teach mode. |
| 551 | "Man-Run" Switch | This switch toggles the UIML between the Manual and Auto-Run modes. |
| 552 | "Insert-Table" Switch | This switch toggles the UIML between the Insert and Table modes. |
| 553 | "Jog-Teach" Switch | This switch toggles the UIML between the Jog and Teach modes. |

Before the UIML apparatus 100 can be set up electrically, the blow-molding machine 10 must be set up mechanically. Once the blow-molding machine 10 is mechanically ready, the operator can initiate electrical set up procedures for the UIML apparatus 100. Such procedures include the following exemplary steps.

Figure 12:
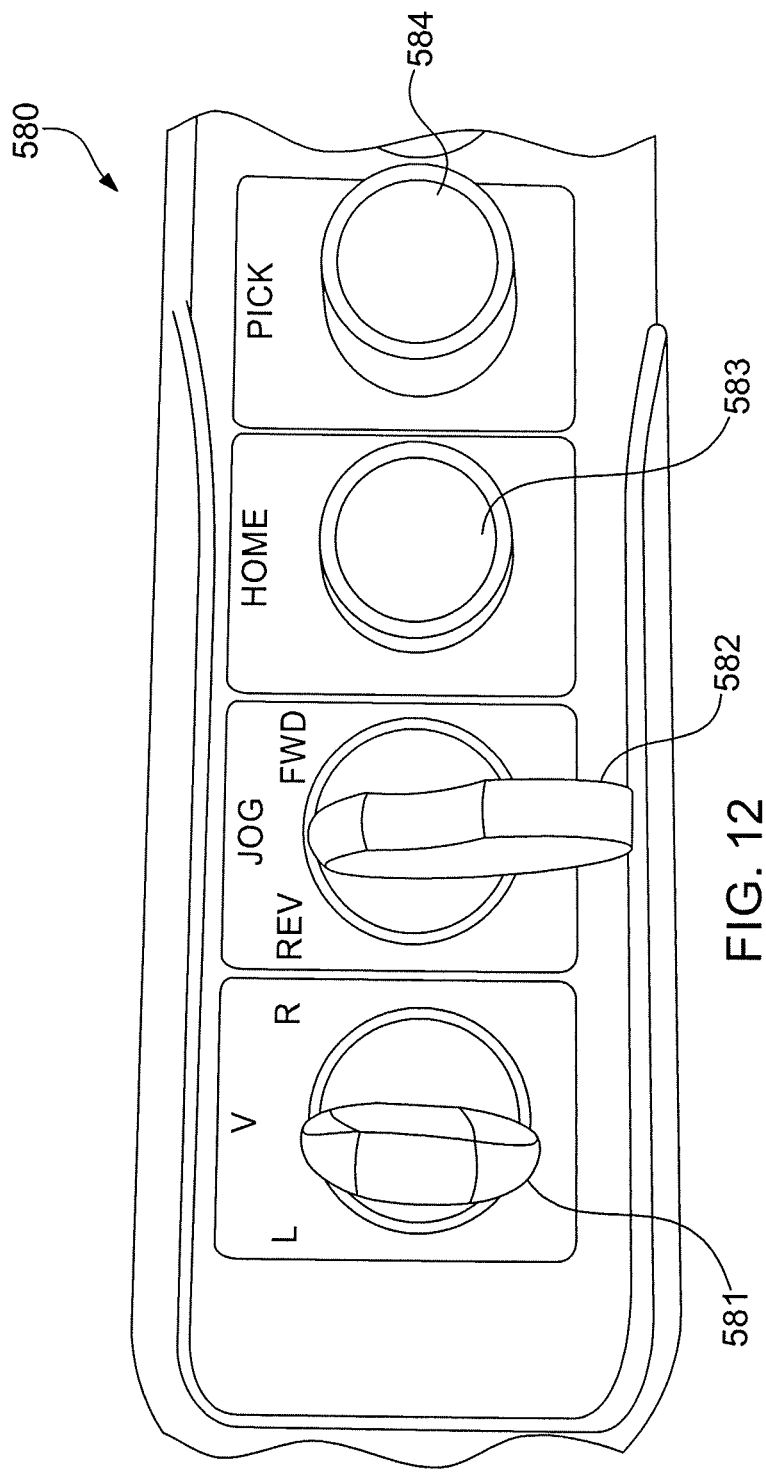
FIG. 12 is a schematic front view illustrating an exemplary pendant, which constitutes a component of the UIML apparatus and further facilitates communication between the operator and the UIML apparatus, according to the present invention.

In Step 1 and with reference to FIG. 11, which illustrates a component of the interactive display 550, the operator must verify, on the HMI 500 of the UIML apparatus 100, that the various motors are enabled. Such verification can be achieved by observing a light on the HMI 500 for the button 501 titled "MOTORS ENABLE." In Step 2 and with reference to FIG. 12, the operator presses the button 583 titled "HOME" on a related pendant 580, which causes the Z-axis vertical slide 109 to move to the default or "home" position. That home position is about 1 inch (2.54 cm) from the mechanical hard stop. The turntables 106, 107 will home to their set position.

In Step 3, the operator places the switch 553 titled "JOG/TEACH" into JOG mode 528 and places the "INSERT/TABLE" switch 552 into INSERT mode 526. In Step 4, the operator places the axis selector switch 581 on the pendant 580 in the "V" position (as opposed to the "L"

or "R" positions). In Step 5, the operator presses the button 501 titled "MOTORS ENABLE" on the HMI 500 of the UIML apparatus 100 to disable the various motors. In Step 6, the operator manually rotates the turntables 106, 107 so that the first placement head 111 is at the label transfer position. In Step 7, the placement heads 111 are extended to the desired stroke for picking the label from the transfer arms 213.

In Step 8, the operator sets the "HOME POSITION" on all turntables 106, 107 and placement heads 111. This step is accomplished by selecting the button 516 titled "DRIVES CONTROL" on the HMI 500 of the UIML apparatus 100. In Step 9, the operator selects one of the two "TABLE" or two "INSERT" buttons, then presses the button titled "SET POSITION" on the "DRIVES CONTROL" screen (not shown). After the operator sets the position on one of the two turntables 106, 107 and its placement heads 111, in Step 10 the operator repeats the steps to set the positions on the other turntable 106, 107 and its placement heads 111. In Step 11, the operator presses both the button 501 titled "MOTORS ENABLE" and the button 502 titled "HOME." After home is complete, the UIML apparatus 100 will switch to its automatic mode. The operator can then toggle the switch 551 back to "MAN" mode. In Step 12, the operator places the JOG switch 582 of the pendant 580 in the "JOG" position (as opposed to the "REV" or "FWD" positions) to jog the Z-axis vertical slide 109 until the placement heads 111 are lined up with the transfer arms 213. In Step 13, the operator visits the "VERTICAL Z-AXIS" page on the "DRIVES CONTROL" screen and presses the button titled "SET POSITION" (not shown). This action saves the actual position to the control system 75. (Note that the operator presses the button 584 titled "PICK" on the pendant 580 when setting the parameters for the placement heads 111.)

The operator is now ready to set the timing between the blow-molding machine 10 and the UIML apparatus 100. The timing can be set using a ten-step procedure. In Step 1 of the procedure, the operator assures that all axes are in the home position (i.e., the button 502 titled "HOME" is activated). In Step 2, the operator places the switch 551 titled "MAN/RUN" of the HMI 500 into MAN mode 505 and places the "JOG/TEACH" switch 553 into TEACH mode 529. In Step 3, the operator jogs the turntable 12 of the blow-molding machine 10 so that the first mold 16 is in its optimal position. The optimal position can be achieved by jogging the placement heads 111 up to the mold labeling position. In Step 4, when the first mold 16 is open at the labeling position, the placement heads 111 can be extended into the mold 16 to verify the correct position.

In Step 5, the operator determines the stroke distance of the Z-axis vertical slide 109. When the Z-axis vertical slide 109 is in the labeling position, the operator visits the inserter axis set up page under the "DRIVE CONTROL" screen of the HMI 500 and activates the button titled "SET INSERTED POSITION" (not shown). In Step 6, the operator verifies that the value on both the "DRIVE CONTROL" screen 516 and the "PROD PARAMS" screen 515 of the HMI 500 is the same for the Z-axis vertical slide 109.

Once the position of the turntable 12 is determined, in Step 7 the operator presses the "ENCODER PRESET" button (not shown) on the "SYSTEM CONFIG" screen 521 of the HMI 500. This action will establish an encoder count for the correct timing between the turntable 12 of the blow-molding machine 10 and the UIML apparatus 100. In Step 8, the operator visits the HMI of the blow-molding machine 10 and, more specifically, the setup screen for the turntable 12 and sets the turntable stop position equal to the encoder count. This action records the current position of the turntable 12 as the index stopping position. In Step 9, the operator determines the jog index stop anticipation offset of the turntable 12. The operator puts the turntable 12 in its jog index mode, then jog indexes the turntable 12 to the next station. When the turntable 12 stops, it will drift past the index set point because of the delay time. In Step 10, the operator subtracts the set point from the actual position. The operator then subtracts the difference from the set point, and enters that value as the new set point. Finally, the operator then jog indexes the turntable 12 to the next station and verifies that the turntable 12 stops at the jog index set point.

Once the timing between the turntable 12 of the blow-molding machine 10 and the UIML apparatus 100 has been established, the operator is ready to establish the stroke distance of the placement heads 111 into the molds 16. The distance is established using a five-step procedure. In Step 1, the operator places the "MAN/RUN" switch 551 on the HMI 500 of the UIML apparatus 100 into "MAN" mode 505; places the "JOG/TEACH" switch 553 into "TEACH" mode 529; and places the "INSERT/TABLES" switch 552 into "INSERT" mode 526. In Step 2 of the procedure, the operator uses the jog index function of the HMI of the blow-molding machine 10 to index the turntable 12 until the first mold 16 is in the labeling position.

In Step 3, the operator addresses the pendant 580 and puts the axis select switch 581 in the "V" position. The operator also puts the "JOG SELECTOR" switch 582 momentarily to the "FWD" position. Thus actuated, the Z-axis vertical slide 109 will move up to the insert position and stop. In Step 4, the operator switches the axis select switch 581 to either "L" or "R" and puts the "JOG SELECTOR" switch 582 momentarily to the "FWD" position. Thus actuated, the placement head 111 will stroke into the mold 16. The operator must stop when the mold 16 is detected and then retract to home position. This position is then saved as the base placement head 111 stroke distance for that mold 16. In Step 5, the operator returns to the HMI of the blow-molding machine 10, jogs the turntable 12 to the next station, and repeats the procedure. The operator completes this teach mode for all of the mold stations.

The turntables 106, 107 of the UIML apparatus 100 will not index until they are in the "HOME" position. In order to home the UIML turntables 106 and 107, the operator completes another procedure. In Step 1, the operator turns the switch 551 on the HMI 500 of the UIML apparatus 100 to the "RUN" mode 506. In Step 2, the operator runs or jogs the turntable 12 for one to two stations, then stops the turntable 12 when the position reads above "0061" but below "0299." In Step 3, the operator pushes the "Home" button 583 on the pendent 580. The UIML apparatus 100 will attempt to Home the turntables 106, 107 and the operator interface 590 will display "HOME FAULT" and "IML OK." In Step 4, the operator turns the switch 553 on the HMI 500 of the UIML apparatus 100 to the "JOG" mode 528. In Step 5, the operator places the axis selector switch 581 of the pendent 580 to the "L" position. In Step 6, the operator turns the jog switch 582 of the pendent 580 in both directions "REV" and "FWD" to verify that the correct axis rotates in both directions.

When combined with the rotary blow-molding machine 10, the UIML apparatus 100 creates an improved system for molding and labeling articles. A prototype system has been successfully operated at a plant of the assignee of the present invention, Graham Packaging Company, L.P. That improved system has successfully reduced total scrap, whether caused by unacceptable molding or labeling of the articles, relative to the assignee's conventional IML system, from about 7.34% to 3.9%. Scrap due to unacceptable labels alone has been reduced to about 2.23%. The "down" time required to set up the improved system, during which the system cannot produce articles, for a change from one article to another has decreased from 3-5 hours to 1-2 hours. Maintenance time has decreased from 10 hours per week (due to mechanical issues, maintenance, and the like) for the conventional IML system to 30-60 minutes per week for the improved system including the UIML apparatus 100.

The UIML apparatus 100 is "universal" in that it can be used across multiple blow molding platforms with a variety of blow-molding machines 10. Although the frame and mounting of the UIML apparatus 100 might differ, depending on the constraints presented by a particular blow-molding machine 10 and application, the main components of the UIML apparatus 100 (turntables 106 and 107 each having an air rotary union 117; a Z-axis vertical slide 109; a placement head 111; at least one label magazine 150; strategically placed air valves 400; and a human machine interface 500, a pendant 580, or an operator interface 590) can easily be used throughout all the platforms.

The UIML apparatus 100 provides increased accuracy on label placement over the conventional IML system. The UIML apparatus 100 also provides increased control over key parameters during the in-mold labeling process.

The UIML includes five servo-driven axes: two turntable axes, a vertical slide Z-axis, and two placement head axes. This configuration gives the UIML apparatus 100 vital electronic control on its motion profile during its process of picking a label, transferring the label, and placing the label into the mold 16 of the blow-molding machine 10. Conventional IML systems were cam and strictly mechanically driven. Because the UIML apparatus 100 is electrically driven and controlled, quicker changeover times and enhanced control on the acceleration, velocity, and deceleration of each axis are achieved during the method of using the UIML apparatus 100.

The placement heads 111 on both sides of the UIML apparatus 100 are independently driven by their own servo motor 303. This configuration allows the operator to independently control the placement heads 111. When setting up the UIML apparatus 100, the operator can stroke the placement head 111 into the mold 16 until it hits the hard stop of the mold cavity. The distance is then recorded for each mold station on the turntable 12 of the blow-molding machine 10. This then allows the placement head 111 to go to that specific distance for each mold 16 as the improved system runs during production. Determining each mold distance allows the UIML apparatus 100 to account for any mold opening variation (which often arises as the molds 16 wear). Any mold variation creates inconsistency with label placement. During testing of the improved system and in production, the assignee has found that the mold distances vary up to 0.25 inches (0.64 cm). Finding the actual distance of the mold 16 allows for drastically improved consistency on the label release point and placement.

A digital regulator 411, controlled by the HMI 500, controls the blowoff pressure of the insert tooling. A blowoff air valve 412 provides blow air pressure to the placement head 111. A vacuum valve 413 provides air pressure to the placement head 111. An in-line vacuum generator creates the vacuum needed on the placement head 111. A digital regulator 414, controlled by the HMI, controls the vacuum pressure of the insert tooling.

The blowoff air valve 412 and the vacuum valve 413 are located on the placement head 111 (in the conventional IML system, the valves were located outside the turntables and a distance from the IML apparatus). Such location facilitates a quick, repeatable response time when placing the label into the mold 16. That advantage is possible, in part, because the air delivery hose lines to the blowoff air valve 412 and the vacuum valve 413 can be reduced from about 12 feet (366 cm) to about one foot (30 cm). The remainder of the air valves 400 are also closer in proximity to the respective components with which the air valves 400 interact, also facilitating a quicker response time. The air valves 400 incorporate a digital control interface (EtherCAT communication) which provides a higher switching accuracy, faster response time, and full diagnostics. An accumulator was also added to the air system to provide consistent air pressure during the method of using the UIML apparatus 100.

Rotary unions 117 provide air to the turntables 106, 107. The conventional IML system uses a slip ring to provide high and low pressure air to the turntables. This slip ring adds maintenance time and often has proven inefficient. The rotary unions 117 provide a simple and straightforward way to provide air to the turntables 106, 107, and require minimal maintenance.

The label magazines 150 are mounted to the frame of the UIML apparatus 100. In contrast, the conventional IML system has its label baskets mounted to the frame of the turntable 12 of the blow-molding machine 10. If there were any adjustments required to the IML apparatus or to the frame of the turntable 12, the label baskets would have to be readjusted to accommodate that change. The UIML apparatus 100 affixes the label magazines 150 to its frame so that if there are any adjustments required to the UIML apparatus 100 or to the frame of the turntable 12, the label magazines 150 will move in sync.

The UIML apparatus 100 also incorporates an absolute multi-turn encoder. Such an encoder allows the operator to detect, diagnose, and control each individual station on the turntable 12 of the blow-molding machine 10. Further, the encoder significantly improves the changeover process because the encoder can easily be reset for set up and synchronization of the turntable 12 with the UIML apparatus 100. Still further, the encoder provides greater accuracy and reliability in that synchronization process.

Once settings are found to be best suited for various articles, the UIML apparatus 100 can save recipes to maintain the settings for those articles. When there is a changeover, the recipe for a specific article can be loaded into the program and all the settings for that article will then be loaded and ready to go. This feature provides a large improvement over the time spent adjusting the conventional IML system during a changeover.

A suitable control system 75 is a Beckhoff Embedded PC with a 6.2 inch HMI and Indusoft Scada Visualization software. PLC logic and servo control cycle time is 0.5 ms which gives the UIML apparatus 100 and blow-molding machine 10 extremely high precision and accuracy with label placement. The programming and control of the UIML apparatus 100 and the programming and control of the blow-molding machine 10 are combined using the control system 75. Tying the programming and control of the UIML apparatus 100 to the programming and control of the blow-molding machine 10 through the control system 75 allows for a more precise setup of the improved system. The control system 75 also provides more tools to diagnose issues during the run. Now, the operator can pinpoint and scope almost every parameter of the UIML apparatus 100 and of the blow-molding machine 10. Parameters that can be monitored include, for example, the position of the master encoder, the distance of each axis, the timing of each axis, the velocity of each axis, the lag position of each servo motor (lag is how much the actual position deviates from the input position), acceleration and deceleration of each axis, torque feedback of each axis, and the timing of every valve that is turned on and off throughout the method of using the system combining the UIML apparatus 100 and the blow-molding machine 10.

Although illustrated and described above with reference to certain specific embodiments and examples, the present invention is nevertheless not intended to be limited to the details shown. Rather, various modifications may be made in the details within the scope and range of equivalents of the claims and without departing from the spirit of the invention.

What is claimed:

1. A system for blow-molding articles from a parison and labeling the articles, the system comprising:
    a blow-molding machine including:
        a blow-molding turntable continuously rotating about an axis of rotation,
        a flow head forming and providing the parison and being fixedly positioned at a first station of the machine proximate the blow-molding turntable, and
        a plurality of molds carried by the blow-molding turntable to position each of the molds adjacent the flow head in turn, each mold including mold portions which are movable between an open configuration to receive the parison from the flow head and a closed configuration to mold the parison; and
    a universal in-mold labeling apparatus including:
        an upper frame assembly having at least two labeling turntables rotatably mounted on the upper frame assembly, each of the at least two labeling turntables having an air rotary union facilitating rotation of the respective labeling turntable and a plurality of suction cups adapted to pick, hold, and release labels, the at least two labeling turntables facilitating delivery of labels to the molds when the molds are in the open configuration creating a cavity,
        a servo-driven Z-axis vertical slide positioned symmetrically between the at least two labeling turntables,
        a servo-driven placement head having at least two placement arms, engaging equally the at least two labeling turntables, and moving up the Z-axis vertical slide to a position between the open mold portions, each placement arm being servo-driven to account for deviations in mold cavity distance,
        at least one label magazine affixed to the upper frame assembly and retaining a plurality of labels, and
        air valves providing air and vacuum to pick, hold, and release labels.

2. The system according to claim 1 further comprising at least one of a human machine interface, a pendant, or an operator interface facilitating communication between an operator of the system and the system.

3. The system according to claim 1 further comprising a programmable logic control for programming and controlling both the blow-molding machine and the universal in-mold labeling apparatus.

4. The system according to claim 1 wherein the air rotary unions provide air to the at least two labeling turntables.

5. The system according to claim 1 wherein the air valves include a blowoff air valve providing blow air pressure to the placement head and a vacuum valve providing air pressure to the placement head, each of the blowoff air valve and the vacuum valve being located on the placement head to facilitate a repeatable response time when placing labels into molds.

6. The system according to claim 1 further comprising two placement heads, one on each side of the universal in-mold labeling apparatus, and separate servo motors independently driving each of the placement heads.

7. The system according to claim 6 wherein the universal in-mold labeling apparatus has at least five servo-driven axes.

8. The system according to claim 1 wherein each of the at least two labeling turntables has a direct drive rotary servo motor with a center bore, one or more transfer arms that extend to pick a label from the label magazine and retract, a pick cylinder that extends the one or more transfer arms, and a starwheel that rotates the one or more transfer arms.

9. The system according to claim 8 wherein the air rotary union of each labeling turntable mounts to the starwheel on the labeling, turntable, via a mounting plate, and passes through the center bore of the direct drive rotary servo motor.

10. The system according to claim 1 wherein each of the at least two labeling turntables operates simultaneously to deliver a label to one of the mold portions so that each mold portion receives its own label for disposition on opposite sides of the article.

11. The system according to claim 1 wherein the Z-axis vertical slide includes a servo motor, a linear slide driven by the servo motor to move the placement head from a transfer position into the molds and then back to the transfer position, and a carriage mount attached to the placement head and engaging the linear slide.

12. A system for blow-molding articles from a parison and labeling the articles, the system comprising:
    a blow-molding machine including:
        a blow-molding turntable continuously rotating about an axis of rotation,
        a flow head forming and providing the parison and being fixedly positioned at a first station of the machine proximate the blow-molding turntable, and
        a plurality of molds carried by the blow-molding turntable to position each of the molds adjacent the flow head in turn, each mold including mold portions which are movable between an open configuration to receive the parison from the flow head and a closed configuration to mold the parison; and
    a universal in-mold labeling apparatus including:
        an upper frame assembly having at least two labeling turntables operating simultaneously and being rotatably mounted on the upper frame assembly, each of the at least two labeling turntables having (i) a plurality of suction cups adapted to pick, hold, and release labels, (ii) a first servo motor with a center bore, (iii) one or more transfer arms that extend to pick a label and retract, (iv) a pick cylinder that extends the one or more transfer arms, (v) a starwheel that rotates the one or more transfer arms, and (vi) an air rotary union facilitating rotation of and providing air to the respective labeling turntable, the air rotary union mounting to the starwheel, via a mounting plate, and passing through the center bore of the first servo motor, the at least two labeling turntables facilitating delivery of labels to the molds when the molds are in the open configuration creating a cavity,
        a servo-driven Z-axis vertical slide positioned symmetrically between the at least two labeling turntables and including a second servo motor, a linear slide driven by the second servo motor to move the placement head from a transfer position into the molds and then back to the transfer position, and a carriage mount attached to the placement head and engaging the linear slide, a servo-driven placement head having at least two placement arms, engaging equally the at least two labeling turntables, and moving up the Z-axis vertical slide to a position between the open mold portions, each placement arm being servo-driven to account for deviations in mold cavity distance, at least one label magazine affixed to the upper frame assembly and retaining a plurality of labels, air valves providing air and vacuum to pick, hold, and release labels, the air valves including a blowoff air valve providing blow air pressure to the placement head and a vacuum valve providing air pressure to the placement head, each of the blowoff air valve and the vacuum valve being located on the placement head to facilitate a repeatable response time when placing labels into molds, at least one of a human machine interface, a pendant, or an operator interface facilitating communication between an operator of the system and the system, and a programmable logic control for programming and controlling both the blow-molding machine and the universal in-mold labeling apparatus.

13. A universal in-mold labeling apparatus for use with a blow-molding machine including a blow-molding turntable continuously rotating about an axis of rotation, a flow head forming and providing a parison and being fixedly positioned at a first station of the machine proximate the blow-molding turntable, and a plurality of molds carried by the blow-molding turntable to position each of the molds adjacent the flow head in turn, each mold including mold portions which are movable between an open configuration to receive the parison from the flow head and a closed configuration to mold the parison and form an article, the universal in-mold labeling apparatus comprising:

an upper frame assembly having at least two labeling turntables rotatably mounted on the upper frame assembly, each of the at least two labeling turntables having an air rotary union facilitating rotation of the respective labeling turntable and a plurality of suction cups adapted to pick, hold, and release labels, the at least two labeling turntables facilitating delivery of labels to the molds when the molds are in the open configuration creating a cavity;

a servo-driven Z-axis vertical slide positioned symmetrically between the at least two labeling turntables;

a servo-driven placement head having at least two placement arms, engaging equally the at least two labeling turntables, and moving up the Z-axis vertical slide to a position between the open mold portions, each placement arm being servo-driven to account for deviations in mold cavity distance;

at least one label magazine affixed to the upper frame assembly and retaining a plurality of labels;

air valves providing air and vacuum to pick, hold, and release labels;

at least one of a human machine interface, a pendant, or an operator interface facilitating communication between an operator of the apparatus and the apparatus; and a programmable logic control for programming and controlling both the blow-molding machine and the universal in-mold labeling apparatus.

14. The apparatus according to claim 13 wherein the air rotary unions provide air to the at least two labeling turntables.

15. The apparatus according to claim 13 wherein the air valves include a blowoff air valve providing blow air pressure to the placement head and a vacuum valve providing air pressure to the placement head, each of the blowoff air valve and the vacuum valve being located on the placement head to facilitate a repeatable response time when placing labels into molds.

16. The apparatus according to claim 13 further comprising two placement heads, one on each side of the universal in-mold labeling apparatus, and separate servo motors independently driving each of the placement heads.

17. The apparatus according to claim 16 wherein the apparatus has at least five servo-driven axes.

18. The apparatus according to claim 13 wherein:

each of the at least two labeling turntables has a direct drive rotary servo motor with a center bore, one or more transfer arms that extend to pick a label from the label magazine and retract, a pick cylinder that extends the one or more transfer arms, and a starwheel that rotates the one or more transfer arms; and the air rotary union of each labeling turntable mounts to the starwheel on the labeling turntable, via a mounting plate, and passes through the center bore of the direct drive rotary servo motor.

19. The apparatus according to claim 13 wherein each of the at least two labeling turntables operates simultaneously to deliver a label to one of the mold portions so that each mold portion receives its own label for disposition on opposite sides of the article.

20. The apparatus according to claim 13 wherein the Z-axis vertical slide includes a servo motor, a linear slide driven by the servo motor to move the placement head from a transfer position into the molds and then back to the transfer position, and a carriage mount attached to the placement head and engaging the linear slide.

* * * * *